(12) United States Patent
Fehrenbach et al.

(10) Patent No.: US 12,414,076 B2
(45) Date of Patent: Sep. 9, 2025

(54) ENHANCED MULTI-CONNECTION OPERATIONS

(71) Applicant: KONINKLIJKE PHILIPS N.V., Eindhoven (NL)

(72) Inventors: Thomas Fehrenbach, Berlin (DE); Baris Göktepe, Berlin (DE); Cornelius Hellge, Berlin (DE); Thomas Wirth, Berlin (DE); Thomas Schierl, Berlin (DE); Nithin Srinivasan, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 564 days.

(21) Appl. No.: 17/667,690

(22) Filed: Feb. 9, 2022

(65) Prior Publication Data

US 2022/0264523 A1 Aug. 18, 2022

Related U.S. Application Data

(63) Continuation of application No. PCT/EP2020/072549, filed on Aug. 11, 2020.

(30) Foreign Application Priority Data

Aug. 13, 2019 (EP) .................... 19191595

(51) Int. Cl.
*H04W 68/02* (2009.01)
(52) U.S. Cl.
CPC .................... *H04W 68/02* (2013.01)
(58) Field of Classification Search
CPC ........................................ H04W 68/02
USPC ....................................... 455/458
See application file for complete search history.

(56) References Cited

U.S. PATENT DOCUMENTS

| | | |
|---|---|---|
| 2012/0190362 A1 | 7/2012 | Subbarayundu et al. |
| 2013/0294417 A1* | 11/2013 | Yerrabommanahalli ..................... H04W 48/18 370/335 |
| 2018/0042014 A1* | 2/2018 | Wu .................... H04W 72/0446 |
| 2018/0077728 A1* | 3/2018 | Shi ........................ H04W 76/10 |
| 2018/0160422 A1* | 6/2018 | Pathak .................. H04W 76/10 |
| 2019/0098596 A1* | 3/2019 | Basu Mallick ......... H04W 8/06 |

FOREIGN PATENT DOCUMENTS

| | | |
|---|---|---|
| WO | 2013063463 A1 | 5/2013 |
| WO | 2016/165071 A1 | 10/2016 |

OTHER PUBLICATIONS

International Search Report and Written Opinion issued in application No. PCT/EP2020/072549.
Dahlmann, E., et al.; "5G NR the Next Generation Wireless Access Technology;" Elsevier Academic Press; 2018; pp. 97-98.

(Continued)

*Primary Examiner* — Qutbuddin Ghulamali

(57) ABSTRACT

A user device, UE, for one or more wireless communication systems, includes one or more transceiver chains. The UE shares at least one transceiver chain with at least two connections to the one or more wireless communication systems. The UE is connected to one or more network entities, like a gNB or another UE, with the connections, and perform one or more operations on the connections at respective operation occasions. When the UE transmits or receives on a current one of the connections, it does not to transmit or receive on the other connections.

12 Claims, 8 Drawing Sheets

(56) References Cited

OTHER PUBLICATIONS

"LTE; Evolved Universal Terrestrial Radio Access (E-UTRA) and Evolved Universal Terrestrial Radio Access Network (E-UTRAN); Overall description; Stage 2 (3GPP TS 36.300 version 13.2.0 Release 13);" LTE-Advanced pro standard, 3GPP TS 136.300, v 13.02.0; 2016; pp. 1-299.
"5G; NR; Overall description; Stage-2 (3GPP TS 38.300 version 15.2.0 Release 15);" 5G/NR standard, TS 138.300, V. 15.2.0; Sep. 2018; pp. 1-86.
"3rd Generation Partnership Project; Technical Specification Group Radio Access Network; Study on NR-based access to unlicensed spectrum (Release 16);" NR-U (New Radio Unlicensed standard), 3GPP TR 38.889, V 16.0.0; Dec. 2018; pp. 1-119.
"Part 11: Wireless LAN Medium Access Control (MAC) and Physical Layer (PHY) specifications;" IEEE 802.11, Wireless LAN Medium Access Control (MAC) and Physical Layer (PHY) specifications; 1997; pp. 1-466.
"3rd Generation Partnership Project; Technical Specification Group Services and System Aspects; Circuit Switched (CS) fallback in Evolved Packet System (EPS); Stage 2 (Release 15);" 3GPP TS 23.272, V15.0.0; Dec. 2017; pp. 1-103.

\* cited by examiner

ENHANCED MULTI-CONNECTION OPERATIONS

CROSS-REFERENCES TO RELATED APPLICATIONS

This application is a continuation of copending International Application No. PCT/EP2020/072549, filed Aug. 11, 2020, which is incorporated herein by reference in its entirety, and additionally claims priority from European Application No. EP 19191595.8, filed Aug. 13, 2019, which is incorporated herein by reference in its entirety.

The present invention concerns the field of wireless communication systems or networks, more specifically communications between a user device, like a UE, and one or more network entities, like a base station or a receiving user device, where the UE is a multi-connection UE sharing a transmitter/receiver chain with two or more connections.

BACKGROUND OF THE INVENTION

FIG. 1 is a schematic representation of an example of a terrestrial wireless network 100 including, as is shown in FIG. 1(a), a core network 102 and one or more radio access networks $RAN_1$, $RAN_2$, ... $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. It is noted that a base station may also operate multiple, i.e., two or more cells (not illustrated in FIG. 1), and, in case a base station operates multiple cells, neighboring cells may include cells operated by the same base station and/or cells operated by the different base stations, i.e., a neighboring cell may also be a different cell of the same base station or a different cell of a different same base station. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $116_1$ to $116_5$, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSCCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NU-U, New Radio Unlicensed, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication systems or networks, like those described above with reference to FIG. 1, for example in a LTE or 5G/NR network, the respective entities may communicate using a plurality of frequency bands, also referred to as a wideband operation. In a wideband operation, for example, the base station, gNB, and/or the user device, UE, may transmit on multiple subbands. The subbands may have different bandwidths or the same bandwidth, like 20 MHz. Some or all of the subbands may be unlicensed bands. For communicating on an unlicensed band, the gNB and UE perform listen-before-talk, LBT, separately per unlicensed subband which may lead to a situation that one or more of the subbands to be used for the wideband operation, also referred to as a subset of the subbands, is busy or occupied due to a transmission or interference by one or more other public land mobile networks, PLMNs, or by one or more other communication systems coexisting on the same frequency band, for example systems operating in accordance with the IEEE 802.11 specification.

SUMMARY

According to an embodiment, a user device, UE, for one or more wireless communication systems may have: one or more transceiver chains, wherein the UE is to share at least one transceiver chain with at least two connections to the one or more wireless communication systems, wherein the UE is to be connected to one or more network entities, like a gNB or another UE, with the connections, and to perform one or more operations on the connections at respective operation occasions, wherein, when the UE is to transmit or receive on a current one of the connections, the UE is not to transmit or receive on the other connections.

Another embodiment may have a network entity for a wireless communication system, wherein
the network entity is to be connected to a UE in the wireless communication system, the UE sharing at least one of its transceiver chains with at least two connections to one or more wireless communication systems, wherein the UE is to perform one or more operations on the connections at respective operation occasions, and wherein the UE is transmitting/receiving to/from the network entity on a current one of the connections,
wherein the network entity is to receive
from the UE information about the one or more or all operation occasions associated with one or more or all of the other connections, and/or
from the UE or from one or more other network entities an indication of the operation occasions on one or some or all the connections, and/or
respective unique identifications of the connections, and
wherein, responsive to the information and/or the indication and/or the unique identifications, the network entity is to
determine periods during which the UE is not available for the network entity, or
calculate or recalculate one or more operation occasions associated with the current connection to avoid clashes or overlaps or collisions with the operation occasions associated with the remaining connections.

According to yet another embodiment, a user device, UE, for one or more wireless communication system may have: one or more transceiver chains, wherein the UE is to share at least one transceiver chain with at least two connections to the one or more wireless communication systems, wherein the UE is to is to be connected to one or more network entities, like a gNB or another UE, with the connections, and to perform one or more operations on the connections at respective operation occasions, wherein, when the UE is to transmit or receive on a current one of the connections, the UE is not to transmit or receive on the other connections, and wherein, when the UE tunes away from an operation on the current connection to perform an operation on another one of the at least two connections, the UE is to signal a tune away signal, TAS, to the network entity, to which it is connected with the current connection.

Another embodiment may have a network entity for a wireless communication system, wherein the network entity is to be connected to a UE in the wireless communication system, the UE sharing at least one of its transceiver chains with at least two connections to one or more wireless communication systems, wherein the UE is to perform one or more operations on the connections at respective operation occasions, and wherein the UE is transmitting/receiving to/from the network entity on a current one of the connections, and the network entity is to receive a tune away signal, TAS, from the UE, the TAS indicating to the network entity that the UE tunes away from an operation on the current connection that is served by the network entity to perform an operation on another connection that is served by another network entity.

Yet another embodiment may have a network entity for a wireless communication system, wherein the network entity is to be connected to a UE in the wireless communication system, the UE sharing at least one of its transceiver chains with at least two connections to one or more wireless communication systems, wherein the UE is to perform one or more operations on the connections at respective operation occasions, and wherein the UE is transmitting/receiving to/from the network entity on a current one of the connections, the network entity is aware of the one or more operation occasions associated with one or more or all of the other connections, and
using the knowledge about the one or more operation occasions, the network entity is to
determine the UE tuning away from an operation on the current connection that is served by the network entity to perform an operation on another connection that is served by another network entity, and
start a timer or put the current connection into a hold condition so as to avoid an error situation for the network entity.

Yet another embodiment may have a network entity for a wireless communication system, wherein the network entity is to be connected to a UE in the wireless communication system, the UE sharing at least one of its transceiver chains with at least two connections to one or more wireless communication systems, wherein the UE is to perform one or more operations on the connections at respective operation occasions, and wherein the UE is transmitting/receiving to/from the network entity on a current one of the connections, the network entity is to receive one or more tune away signals, TASs, from the UE, the TAS indicating to the network entity that the UE tunes away from an operation on the current connection that is served by the network entity to perform an operation on another connection that is served by another network entity, and responsive to the TAS, the network entity is to start a timer or to put the current connection into a hold condition so as to avoid an error situation for the network entity.

According to another embodiment, a wireless communication system may have: one or more UEs, and one or more network entities, wherein one or more of the UEs includes an inventive UE, and/or wherein one or more network entities includes an inventive network entity.

Yet another embodiment may have a method for operating one or more wireless communication systems, wherein the one or more wireless communication systems include one or more user devices, UEs, and one or more network entities, like a gNB or another UE, wherein one or more of the UE include one or more transceiver chains, shares at least one transceiver chain with at least two connections to the one or more wireless communication systems, and is connected to one or more network entities, like a gNB or another UE, with the connections for performing one or more operations on the connections at respective operation occasions, and wherein the method may have the steps of: transmitting or receiving, by the UE, on a current one of the connections, while not transmitting or receiving on the other connections, receiving, at a network entity,
   from a UE information about the one or more or all operation occasions associated with one or more or all of the other connections, and/or
   from a UE or from one or more other network entities an indication of the operation occasions on one or some or all the connections, and/or
   respective unique identifications of the connections, and
responsive to the information and/or the indication and/or the unique identifications,
   determining periods during which the UE is not available for the network entity, or
   calculating or recalculating one or more operation occasions associated with the current connection to avoid clashes or overlaps or collisions with the operation occasions associated with the remaining connections.

Yet another embodiment may have a method for operating one or more wireless communication systems, wherein the one or more wireless communication systems include one or more user devices, UEs, and one or more network entities, like a gNB or another UE, wherein one or more of the UE include one or more transceiver chains, shares at least one transceiver chain with at least two connections to the one or more wireless communication systems, and is connected to one or more network entities, like a gNB or another UE, with the connections for performing one or more operations on the connections at respective operation occasions, and wherein the method may have the steps of: transmitting or receiving, by the UE, on a current one of the connections, while not transmitting or receiving on the other connections, responsive to the UE tuning away from an operation on the current connection to perform an operation on another one of the at least two connections, providing a tune away signal, TAS, to the network entity, to which the UE is connected with the current connection.

Still another embodiment may have a method for operating one or more wireless communication systems, wherein the one or more wireless communication systems include one or more user devices, UEs, and one or more network entities, like a gNB or another UE, wherein one or more of the UE include one or more transceiver chains, shares at least one transceiver chain with at least two connections to the one or more wireless communication systems, and is connected to one or more network entities, like a gNB or another UE, with the connections for performing one or more operations on the connections at respective operation occasions, the network entity being aware of the one or more operation occasions associated with one or more or all of the other connections, and wherein the method may have the steps of: transmitting or receiving, by the UE, on a current one of the connections, while not transmitting or receiving on the other connections, using the knowledge about the one or more operation occasions, determining a UE tuning away from an operation on the current connection that is served by a network entity to perform an operation on another connection that is served by another network entity, and starting a timer or putting the current connection into a hold condition so as to avoid an error situation for the network entity.

Another embodiment may have a method for operating one or more wireless communication systems, wherein the one or more wireless communication systems includes one or more user devices, UEs, and one or more network entities, like a gNB or another UE, wherein one or more of the UE include one or more transceiver chains, shares at least one transceiver chain with at least two connections to the one or more wireless communication systems, and is connected to one or more network entities, like a gNB or another UE, with the connections for performing one or more operations on the connections at respective operation occasions, and wherein the method may have the steps of: transmitting or receiving, by the UE, on a current one of the connections, while not transmitting or receiving on the other connections, and receiving, at a the network entity, one or more tune away signals, TASs, the TAS indicating to the network entity that the UE tunes away from an operation on the current connection that is served by the network entity to perform an operation on another connection that is served by another network entity, and responsive to the TAS, starting, by the network entity, a timer or putting the current connection into a hold condition, by the network entity, so as to avoid an error situation for the network entity.

Still another embodiment may have a non-transitory digital storage medium may have a computer program stored thereon to perform the inventive methods, when said computer program is run by a computer.

It is noted that the information in the above section is only for enhancing the understanding of the background of the invention and therefore it may contain information that does not form conventional technology that is already known to a person of ordinary skill in the art.

Starting from conventional technology as described above, there may be a need for improvements for multi-connection communications between a user device sharing its RF chain with two or more of the connections and respective network entities.

BRIEF DESCRIPTION OF THE DRAWINGS

Embodiments of the present invention will be detailed subsequently referring to the appended drawings, in which:

FIG. 1(*b*) shows a schematic representation of an example of a wireless communication system;

DETAILED DESCRIPTION OF THE INVENTION

Figure 1A:
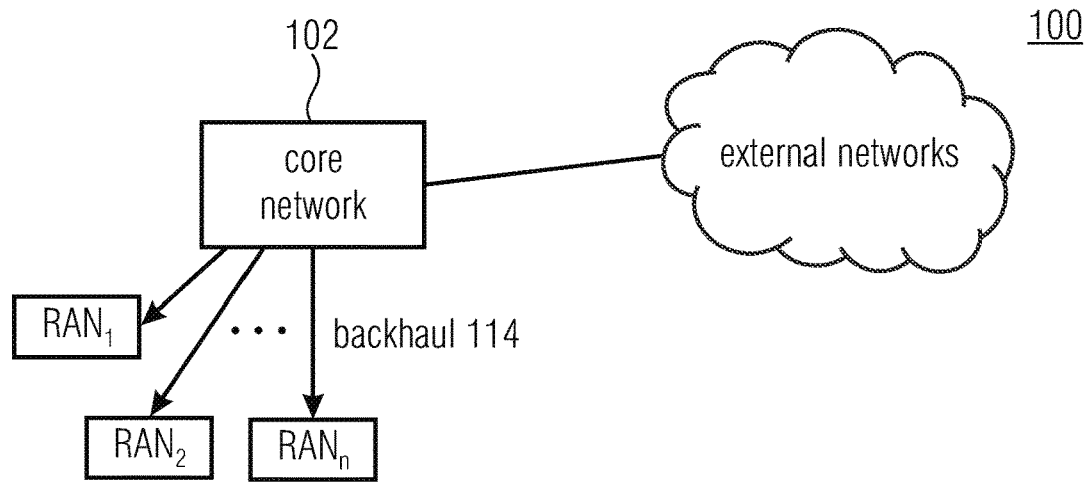
FIG. 1(*a*) shows a schematic representation of an example of a wireless communication system.

Embodiments of the present invention are now described in more detail with reference to the accompanying drawings in which the same or similar elements have the same reference signs assigned.

In wireless communication systems or networks, like the one described above with reference to FIG. 1, one or more of the mobile users, UEs, may be so-called multi-connection mobile users or multi-connection UEs. A multi-connection UE may include one or more transmitter (Tx)/receiver (Rx) chains, also referred to as radio frequency, RF, transceiver chains. The multi-connection UE shares an RF transceiver chain with two or more connections, which also may be referred to as independent or shared connections, so that, at a certain point in time only one of the connections has access to the RF transceiver chain. In other words, at a certain point in time the UE is connected to a network entity with a current one of the connections that share the RF transceiver chain, and the network entity may be a base station in case of a communication over the Uu interface, or it may be a other UE in case of a sidelink communication using, for example, the PC5 interface. The current connection may also be referred to as being in the connected state. The other connections that share with the current connection the RF transceiver chain are in a state in which they have no active connection to a network entity, however, the other connections are able to perform one or more operations at respective operation occasions. The network entity may be a network entity different from the one to which the current connection communicates. For example, when considering the a wireless communication system, some of the base stations may be operated in accordance with a first standard, like the GSM or LTE standard, while other base stations may be operated in accordance with another standard, like the NR standard. Thus, the multi-connection UE may provide for a first connection to the GSM network and for a second connection to the NR network via a common RF transceiver chain so that, when the UE is connected via its current connection to the GSM network, this connection is in the connected state, while the second connection to the NR system is not active, for example is in an idle state or in an inactive state or in a DRX cycle. The respective network entities are not necessarily associated with different standards, rather, the network entities may employ the same standard, for example, the UE may provide for two independent connections to two different network entities of the same network, like a NR network. The entities may be operated by the same or by different mobile network operators, MNOs.

Thus, in a scenario as explained above, the current connection is in the connected state, also referred to as to the RRC connected state. In this state, a data transfer between the UE and the network is possible. The RRC context is established. Also the core network connection is established and a network-controlled mobility is enabled. On the other hand, the other connections are in a non-active state, for example in an idle state, also referred to as the RRC idle state. In this state, no data transfer is possible, there is no RRC context and there is no core network connection. However, a device controlled mobility is enabled. In accordance with the NR approach, a new RRC state is introduced, which is referred to as the RRC inactive state. This state may be seen as being somewhat in-between the RRC idle state and the RRC connected state as it is known from the LTE standard. The RRC inactive state allows a UE to receive certain control messages as well as to send a limited set of control messages to make it easier to track a moving UE within a cell, for example in case of vehicular UEs, also referred to as V-UEs. Thus, a connection of the UE sharing the RF transceiver chain with another connection and being in the non-active state may also be in an inactive state, like the just-mentioned RRC inactive state. During the RRC inactive state, no data transfer is possible, however, the RRC context as well as the core network connection is established and also device-controlled mobility is enabled. Furthermore, the non-active connection may be in a DRX state where the UE is RRC connected but not receiving any data from the network for the duration of the DRX cycle.

The multi-connection UE may provide for an identification of the connections to the one or more wireless communication systems or the entities thereof. For example, the respective connections sharing the RF transceiver chain of the UE may be identified by one or more subscriber identities module, SIM, cards in the UE, and each SIM card is associated with one of the connections. The connections may also be identified by one or more of:

one or more universal Subscriber Identity Module, USIM, cards, each USIM card associated with one of the connections, one or more universal integrated circuit cards, ICCs, each ICC associated with one of the connections, one or more embedded Subscriber Identity Modules, eSIMs, each eSIM associated with one of the connections, one or more certificates, each certificate associated with one of the connections, one or more pairs of username and password, each pair associated with one of the connections, one or more International Mobile Station Equipment Identities (IMEI) each associated with one of the connections, one or more Mobile Equipment Identifiers (MEID) each associated with one of the connections.

Thus, when considering a multi-connection UE as described above, the respective connections that share the RF transceiver chain, which have associated therewith the respective identifiers, may be seen from a network perspective as separate UEs being served by the respective network entities. The connections may be associated with the same or different network operators.

In a multi-connection UE as described above, certain operations may be performed at certain occasions also referred to as certain instances in time, over the respective connections that share the RF transceiver chain. Sharing the RF transceiver chain among one or more connections, however, results in a situation that a service for the UE may be provided only using of the connections, thereby rendering the UE to be not reachable using the other connections. Thus, operations may only be performed using the current connection at the certain occasions while other operations over the non-current connections which are in the non-active state, may not be performed. Thus, operations for the non-current connection may be missed by the UE. On the other hand, in case the implementation is such that the other connections become active at the occasions where their respective operations are to be performed, this results in a service interruption of the current connection to the network entity which currently serves the UE via the current connection.

The above-referenced operations may include a variety of different operations to be performed between the UE and the network at different points in time. For example, the operations may include one or more of the following:
  reading a broadcast of system information, MIB/SIB,
  receiving RAN-based notification area (RNA) updates,
  reading a paging channel during a paging occasion, PO,
  reading a PDCCH monitoring occasion, MO,
  receiving or transmitting according to a semi-persistent scheduling, SPS,
  transmitting on a configured grant, CG,
  performing a measurement, e.g. SMTC or DMTC or mobility measurements,
  performing a random access, RACH,
  transmitting on a scheduled grant, PUSCH,
  transmitting any control information, e.g. via PUCCH,
  receiving scheduled data, PDCCH or PDSCH,
  transmitting on a sidelink interface using any sidelink physical channel, e.g. PSSCH/PSCCH/PSFCH via PC5.

With reference to the reading of a paging channel during the paging occasion, PO, some problems with regard to the respective operations occurring at certain occasions on the different shared connections, one of which is in the connected state while the others are in the idle state or in the inactive state shall, now be discussed. The paging is a process in which an idle mode UE wakes up periodically based on a DRX, discontinuous reception, cycle to read a paging channel during the paging occasion. In case the UE finds relevant information in the paging channel, the UE will transition to the connected mode. Otherwise, the UE continues to monitor subsequent paging occasions, POs. This feature is supported by the UEs, and in case of a multi-connection UE all of the connections need to monitor the respective paging channels. A first problem in a multi-connection UE having a single RF transceiver chain or sharing one of its RF transceiver chains among at least two connections is that the need for each connection to monitor the respective paging channel may lead to an overlap in the paging occasions which, in turn, may result in a delay or a loss of data on any of the connections. In other words, at least some of the connections may be associated with paging occasions that occur at the same time or that overlap, so that when being connected via the current connection to read the paging channel, the paging information on another paging channel for a non-current connection that occurs substantially at the same time, cannot be read by the UE and is lost. Therefore, data may be lost because the other connection is not aware that data is to be sent via this connection or at least a delay in receiving the data may occur until the paging channel can be read by the other connection.

Another issue regarding multi-connection UEs is the above-mentioned service interruption. For example, when considering the current connection to the network entity which is in the RRC connected state, and in case it is useful that also the other connections monitor their paging occasion or monitor system information, the UE may abruptly tune away from the network entity to which it is currently connected and by which the UE is currently served via the current connection. The tuning away may include that the UE connects to another network entity using another one of the shared connections so as to perform the paging or system information update using the other one of the connections sharing with the current connection the RF transceiver chain of the multi-connection UE. This leads to a service interruption on the current connection which, in turn, may lead to an unexpected behavior in the network.

In other words, when an operation is to be performed at a certain operation occasion on another one of the connections which is not the current connection, the UE tunes away from the current connection so as to be in active or connected state to another network entity via the other connection so as to allow to perform the certain operation at the operation occasion or time. This may also be referred to as the UE temporarily tuning away from the current connection and returning to the current connection after completing the operation on the other connection.

The service interruption may lead to an undesired error situation at the network entity because the time that the UE is catering to the services or operations using another one of the non-current connections, this, conventionally, leads to an error case for the serving network entity because the serving network entity is not aware of the UE procedure and the type of operations using the other connections. Thus, the network entity may continue scheduling resources for a connection to the temporarily suspended connection because of the tune away which leads to a waste of resources which cannot be used for connections to other UEs in the wireless system, and also an unexpected behavior may result since the current connection may except some control information, e.g. PUCCH, and/or a data transmission, e.g. PUSCH, from the UE. For example, if the UE does not transmit a PUCCH, the HARQ state of previous transmissions stays unclear. In the worst scenario, the gNB may falsely detect a PUCCH transmission including HARQ feedback and interpret a false acknowledgement for the previous transmissions.

As mentioned above, the above problems may not only arise when reading the paging channel of the respective systems or networks to which the connections sharing the RF transceiver chain are connected, but it may also occur for the above-summarized operations involving the one or more other connections which are in the idle state or in the inactive state to connect to the entities which serve the UE via the respective connection so as to obtain information or data. In other words, the situation that certain operations at certain occasions need to be carried out on the different connections that share a RF transceiver chain in the UE may result in situations in which the respective occasions overlap so that only one of the connections can receive the information and/or it may lead to a service interruption of the current operation.

The present invention addresses the above-discussed issues and provides improvements and enhancements for the operation of multi-connection UEs within one or more wireless communication systems or networks.

Figure 1B:
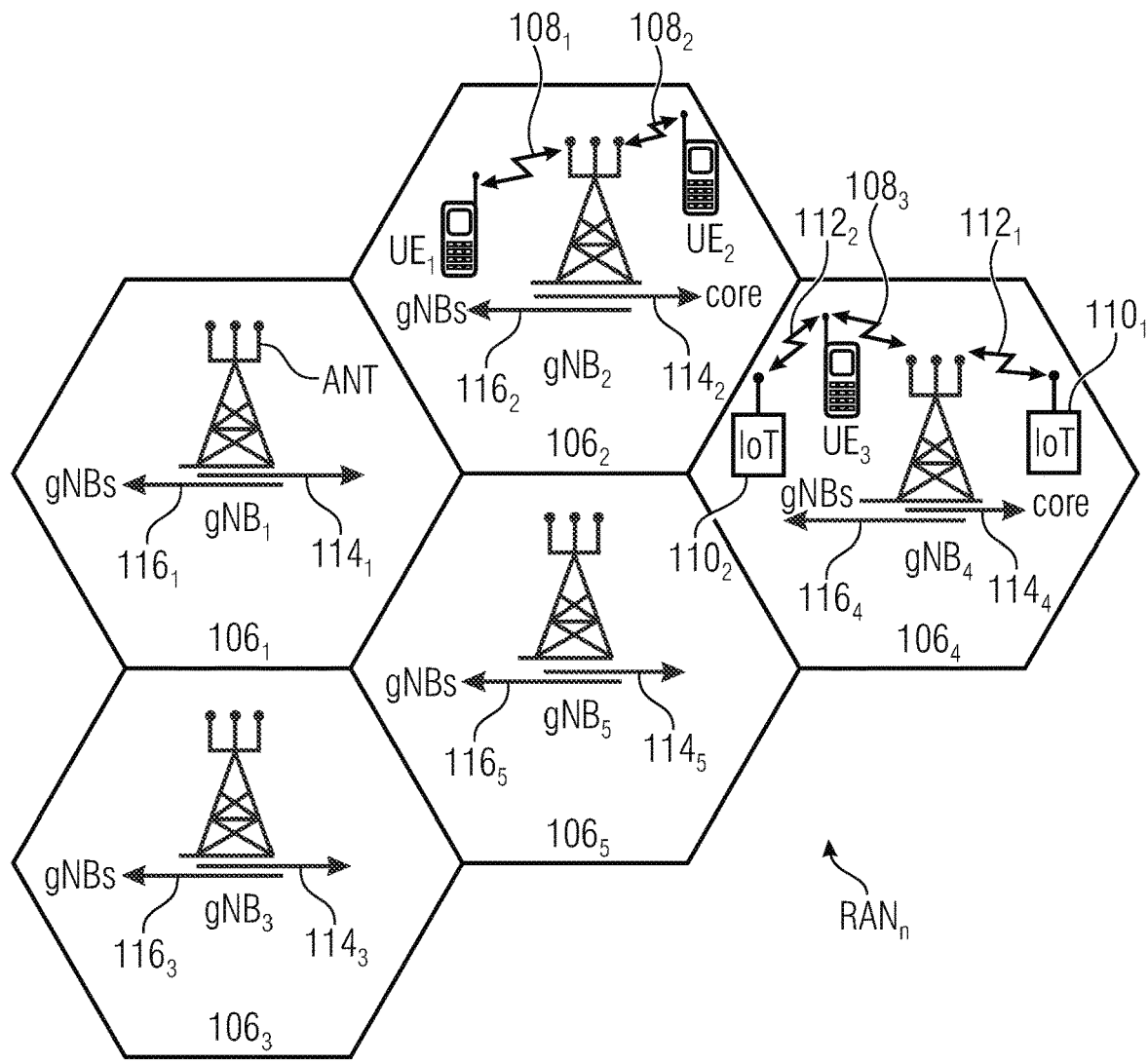
Figure 2:
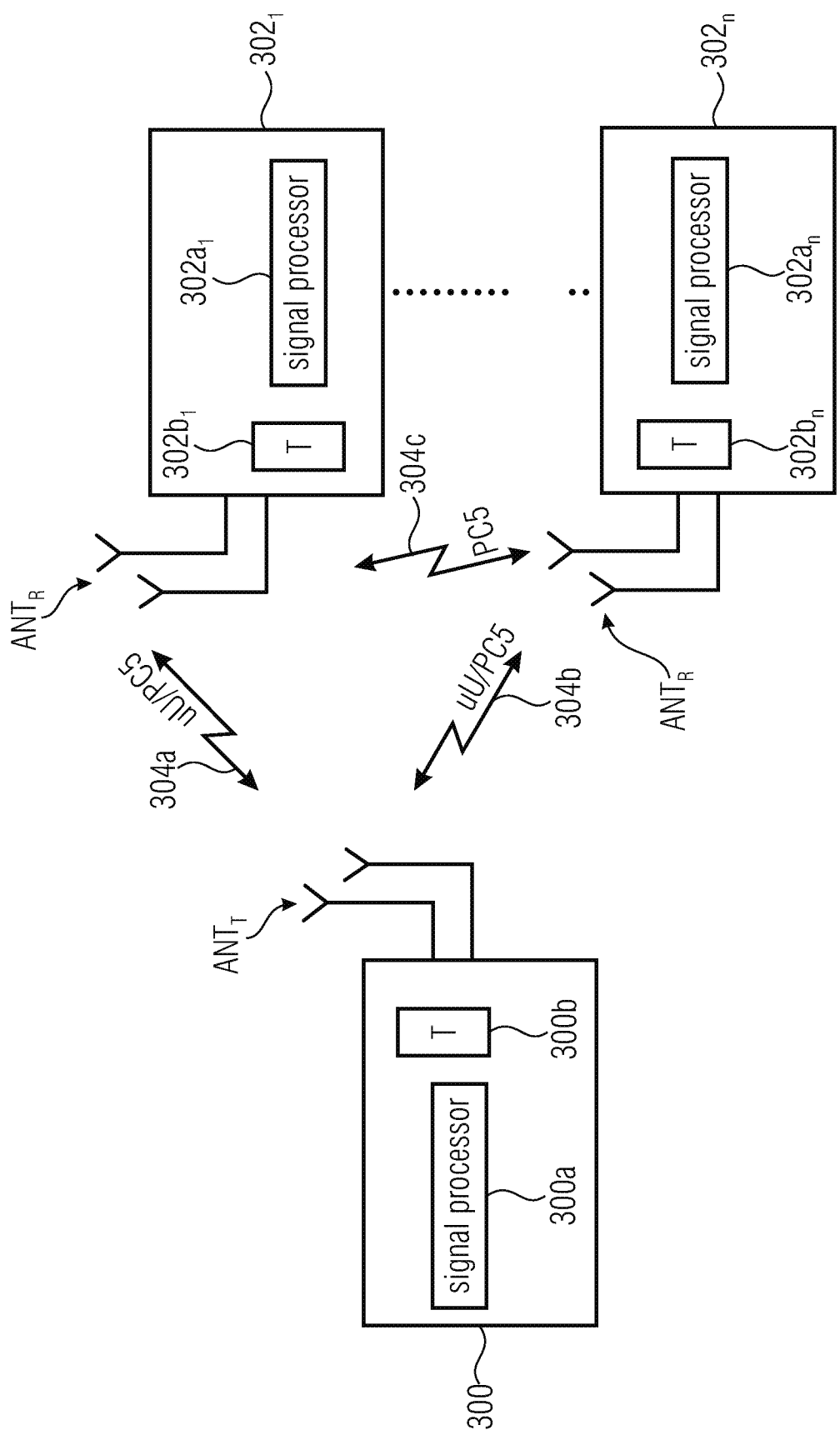
FIG. 2 is a schematic representation of a wireless communication system including a transmitter, like a base station, and one or more receivers, like user devices, UEs.

Embodiments of the present invention may be implemented in a wireless communication system as depicted in FIG. 1 including base stations and users, like mobile terminals or IoT devices. FIG. 2 is a schematic representation of a wireless communication system including a transmitter 300, like a base station, and one or more receivers $302_1$ to $302_n$, like user devices, UEs. The transmitter 300 and the receivers 302 may communicate via one or more wireless communication links or channels 304a, 304b, 304c, like a radio link. The transmitter 300 may include one or more antennas $ANT_T$ or an antenna array having a plurality of antenna elements, a signal processor 300a and a transceiver 300b, coupled with each other. The receivers 302 include one or more antennas $ANT_R$ or an antenna array having a plurality of antennas, a signal processor $302a_1$, $302a_n$, and a transceiver $302b_1$, $302b_n$ coupled with each other. The base station 300 and the UEs 302 may communicate via respective first wireless communication links 304a and 304b, like a radio link using the Uu interface, while the UEs 302 may communicate with each other via a second wireless communication link 304c, like a radio link using the PC5 interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system, the one or more UEs 302 and the base stations 300 may operate in accordance with the inventive teachings described herein.

User Device/Network Entity

The present invention provides a user device, UE, for one or more wireless communication systems, the UE comprising:
  one or more transceiver chains,
  wherein the UE is to share at least one transceiver chain with at least two connections to the one or more wireless communication systems,
  wherein the UE is to be connected to one or more network entities, like a gNB or another UE, with the connections, and to perform one or more operations on the connections at respective operation occasions,
  wherein, when the UE is to transmit or receive on a current one of the connections, the UE is not to transmit or receive on the other connections.

In accordance with embodiments as described in the paragraph above the UE is to signal to the network entity, to/from which it transmits/receives on the current connection, information about the one or more operation occasions associated with one or more or all of the other connections.

In accordance with embodiments as described above the UE is to signal an indication from which the operation occasions on one or some or all the connections are derivable, e.g., by the one or more network entities.

In accordance with embodiments as described in the paragraph above the indication includes
  a device identifier, the device identifier being unique for each UE in the wireless communication system and being associated with identifications of the connections, so as to indicate that the UE provides the at least two connections, and/or
  identifications of one or more or all of the connections, so as to indicate that the UE provides the at least two connections.

In accordance with embodiments as described above attaching to a wireless communication system, the UE is to signal the information about the one or more operation occasions associated with one or more or all of the other connections, e.g., as part of an RRC signaling, and/or the indication from which the operation occasions on one or some or all the connections are derivable, e.g., as part of the UE capability information.

In accordance with embodiments as described above the UE signals the information or the indication so as to
  inform the one or more network entities about instances at which the UE is not available for the network entity, or
  allow the one or more network entities to avoid clashes or overlaps or collisions of one or more or all operation occasions associated with the current connection with the operation occasions associated with the remaining connections.

In accordance with embodiments as described above the UE is to provide for an identification, e.g., a unique identification or ID, of the respective connections to the one or more wireless communication systems, the identification including one or more of the following:
  one or more Subscriber Identity Module, SIM, cards, each SIM card associated with one of the connections,
  one or more universal Subscriber Identity Module, USIM, cards, each USIM card associated with one of the connections,
  one or more universal integrated circuit cards, ICCs, each ICC associated with one of the connections,
  one or more embedded Subscriber Identity Modules, eSIMs, each eSIM associated with one of the connections,
  one or more certificates, each certificate associated with one of the connections,
  one or more pairs of username and password, each pair associated with one of the connections,
  one or more International Mobile Station Equipment Identities (IMEI) each associated with one of the connections,
  one or more Mobile Equipment Identifiers (MEID) each associated with one of the connections.

In accordance with embodiments as described above the operations include one or more of the following
  reading a broadcast of system information, MIB/SIB,
  receiving RAN-based notification area (RNA) updates,
  reading a paging channel during a paging occasion, PO,
  reading a PDCCH monitoring occasion, MO,
  receiving or transmitting according to a semi-persistent scheduling, SPS,
  transmitting on a configured grant, CG,
  performing a measurement, e.g. SMTC or DMTC or mobility measurements,
  performing a random access, RACH,
  transmitting on a scheduled grant, PUSCH,
  transmitting any control information, e.g. via PUCCH,
  receiving scheduled data, PDCCH or PDSCH,
  transmitting on a sidelink interface using any sidelink physical channel, e.g. PSSCH/PSCCH/PSFCH via PC5.

In accordance with embodiments as described above the connections are ranked or prioritized, and wherein the UE is to signal to the network entity only information about operation occasions associated with the other connections having a rank or priority that is the same or higher than the rank or priority of the current connection.

In accordance with embodiments as described above the rank or priority of a connection may be decided or determined by the UE, or by a network entity, or by an over-the-top, OTT, application.

In accordance with embodiments as described above the UE is to switch from the current connection, which becomes an old current connection, to one of the other connections, which becomes a new current connection, so as to signal to a network entity, to which it is connected with the new current connection to which the UE switched, information about the one or more or all operation occasions associated with the old current connection and/or one or more or all of the remaining connections.

In accordance with embodiments as described above the network entities, to/from which the UE is to transmit/receive using the respective connections, belong to the same mobile network operator, MNO, or to different mobile network operators, MNOs.

In accordance with embodiments as described above the connections are in the same state or are in different states, the states including, for example, one or more of:

an RRC_CONNECTED state,
an RRC_INACTIVE state, and
an IDLE state.

In accordance with embodiments as described above the UE is to be configured or pre-configured to use the at least two connections by the one or more wireless communication systems or by one or more of the network entities, like a gNB or another UE, by an application, APP, running on the UE or over-the-top, OTT.

The present invention provides a network entity for a wireless communication system, wherein the network entity is to be connected to a UE in the wireless communication system, the UE sharing at least one of its transceiver chains with at least two connections to one or more wireless communication systems, wherein the UE is to perform one or more operations on the connections at respective operation occasions, and wherein the UE is transmitting/receiving to/from the network entity on a current one of the connections, wherein the network entity is to receive from the UE information about the one or more or all operation occasions associated with one or more or all of the other connections, and/or from the UE or from one or more other network entities an indication of the operation occasions on one or some or all the connections, and/or respective unique identifications of the connections, and wherein, responsive to the information and/or the indication and/or the unique identifications, the network entity is to determine periods during which the UE is not available for the network entity, or calculate or recalculate one or more operation occasions associated with the current connection to avoid clashes or overlaps or collisions with the operation occasions associated with the remaining connections.

In accordance with embodiments as described above the network entity is to extend a timer for declaring a radio link failure, RLF, at least by a duration of an period during which the UE is not available, or by a duration of operation occasions associated with the other connections.

In accordance with embodiments as described above the network entity is not to schedule data for the UE while a duration of a period during which the UE is not available, or while a duration of operation occasions associated with the other connections.

The present invention provides a user device, UE, for one or more wireless communication system, the UE comprising:

one or more transceiver chains, wherein the UE is to share at least one transceiver chain with at least two connections to the one or more wireless communication systems, wherein the UE is to is to be connected to one or more network entities, like a gNB or another UE, with the connections, and to perform one or more operations on the connections at respective operation occasions, wherein, when the UE is to transmit or receive on a current one of the connections, the UE is not to transmit or receive on the other connections, and wherein, when the UE tunes away from an operation on the current connection to perform an operation on another one of the at least two connections, the UE is to signal a tune away signal, TAS, to the network entity, to which it is connected with the current connection.

In accordance with embodiments as described above the operation on the other one of the at least two connections includes one or more of the following reading a broadcast of system information, MIB/SIB,
receiving RAN-based notification area (RNA) updates,
reading a paging channel during a paging occasion, PO,
reading a PDCCH monitoring occasion, MO,
receiving or transmitting according to a semi-persistent scheduling, SPS,
transmitting on a configured grant, CG,
performing a measurement, e.g. SMTC or DMTC or mobility measurements,
performing a random access, RACH,
transmitting on a scheduled grant, PUSCH,
transmitting any control information, e.g. via PUCCH,
receiving scheduled data, PDCCH or PDSCH,
transmitting on a sidelink interface using any sidelink physical channel, e.g. PSSCH/PSCCH/PSFCH via PC5.

In accordance with embodiments as described above the resources for the TAS are preconfigured and the UE is to receive them in an RRC configuration/reconfiguration message, or the resources for the TAS are dynamically assigned as a part of a resource assignment during an RRC_CONNECTED state.

In accordance with embodiments as described above the TAS includes an indication of the operation the UE tunes to and/or a time the UE is tuned away from the operation on the current connection.

In accordance with embodiments as described above responsive to an indication that the operation on the other connection, to which the UE tuned away, takes more time, e.g., more time than the predefined amount of time, the UE is to inform the network entity of the current connection that the tune away duration is longer than a tune away duration defined for the TAS, e.g., by:

signaling a long tune away signal, Long TAS, to the network entity of the current connection, e.g., in case the indication is provided at the time of tuning away, or signaling a TAS update to the network entity of the current connection, e.g., in case the indication is provided at some time while the UE is tuned away.

In accordance with embodiments as described above the operation taking more time includes one or more of the following receiving a call in a paging occasion, PO,
receiving an indication that data is to be received,
receiving an indication that a high priority operation is to be performed.

In accordance with embodiments as described above the connections are in the same state or are in different states, the states including, for example, one or more of:
an RRC_CONNECTED state,
an RRC_INACTIVE state, and
an IDLE state.

In accordance with embodiments as described above when tuning away, the current connection transitions to the RRC_INACTIVE state.

The present invention provides a network entity for a wireless communication system, wherein the network entity is to be connected to a UE in the wireless communication system, the UE sharing at least one of its transceiver chains with at least two connections to one or more wireless communication systems, wherein the UE is to perform one or more operations on the connections at respective operation occasions, and wherein the UE is transmitting/receiving to/from the network entity on a current one of the connections, and the network entity is to receive a tune away signal, TAS, from the UE, the TAS indicating to the network entity that the UE tunes away from an operation on the current connection that is served by the network entity to perform an operation on another connection that is served by another network entity.

The present invention provides a network entity for a wireless communication system, wherein the network entity is to be connected to a UE in the wireless communication system, the UE sharing at least one of its transceiver chains with at least two connections to one or more wireless communication systems, wherein the UE is to perform one or more operations on the connections at respective operation occasions, and wherein the UE is transmitting/receiving to/from the network entity on a current one of the connections, the network entity is aware of the one or more operation occasions associated with one or more or all of the other connections, and using the knowledge about the one or more operation occasions, the network entity is to
determine the UE tuning away from an operation on the current connection that is served by the network entity to perform an operation on another connection that is served by another network entity, and
start a timer or put the current connection into a hold condition so as to avoid an error situation for the network entity.

The present invention provides a network entity for a wireless communication system, wherein the network entity is to be connected to a UE in the wireless communication system, the UE sharing at least one of its transceiver chains with at least two connections to one or more wireless communication systems, wherein the UE is to perform one or more operations on the connections at respective operation occasions, and wherein the UE is transmitting/receiving to/from the network entity on a current one of the connections, the network entity is to receive one or more tune away signals, TASs, from the UE, the TAS indicating to the network entity that the UE tunes away from an operation on the current connection that is served by the network entity to perform an operation on another connection that is served by another network entity, and responsive to the TAS, the network entity is to start a timer or to put the current connection into a hold condition so as to avoid an error situation for the network entity.

In accordance with embodiments as described above a range of the timer includes a switching time across the connections plus and the time for performing the operation, like the time for processing data.

In accordance with embodiments as described above the length of the timer depends on one or more of the UE capabilities, and a time taken to perform the one or more operations, like cell selection/reselection, paging, system information and tracking/routing area update, SPS transmissions, CG transmissions, measurements.

In accordance with embodiments as described above, the network entity is not to schedule any data for the current connection during the length of the timer.

In accordance with embodiments as described above, in the HOLD condition,
a context of the current connection is maintained, and/or
a reuse of the resources assigned to the current connection is allowed, and/or
the network entity does not expect any configured UL transmissions from the current connection, such as PUCCH, PUSCH or CG, and/or
extent or delay the start of the RLF timer at least by the duration of the HOLD condition.

In accordance with embodiments as described above the network entity is to start a timer and to put the current connection into the hold condition, and wherein the network entity is to keep the current connection in the hold condition for the time duration of the timer.

In accordance with embodiments as described above at the expiry of the timer,
the network entity is to continue scheduling to the current connection and is to expect configured UL transmissions from the current connection, such as PUCCH and CG, or
the network entity is to receive form the UE a signal e.g., the tune away signal, that the UE returned from the tune away state, and, responsive to the signal, the network entity is to continue scheduling to the current connection, or
the network entity is to start a further timer that defines a period over which the network entity maintains the context of the current connection.

In accordance with embodiments as described above at the expiry of the timer, the network entity is to start a further timer that defines a period over which the network entity maintains the context of the current connection.

In accordance with embodiments as described above at the expiry of the further timer, the network entity is to declare a radio link failure, RLF, and continue to RLF recovery procedures.

In accordance with embodiments as described above the network entity is to receive from the UE an information that the tune away duration is longer than a tune away duration defined for the TAS, e.g.,
a long tune away signal, Long TAS, e.g., in case the indication is provided at the time of tuning away, or
a TAS update, e.g., in case the indication is provided at some time while the UE is tuned away.

In accordance with embodiments as described above responsive to the long tune away signal or the TAS update within the timer,
in case the network entity is only to start the timer, the network entity is to stop the timer,
in case the network entity is only to put the current connection into the hold condition, the network entity is remove the hold condition,
in case the network entity is to start the timer and to put the current connection into the hold condition, the network entity is to stop the timer and remove the hold condition, and responsive to the long tune away signal or the TAS update within the further timer, the network entity is to stop the further timer and remove the hold condition.

In accordance with embodiments as described above responsive to the TAS, in case of a predefined situation, e.g., the delivery of an important message by the network entity over the current connection, the network entity is to tell the UE that the tune away is to be deferred, e.g., by signaling to the UE a delta-timer, or responsive to the long tune away signal or to the TAS update, in case of a predefined situation, e.g., the delivery an important message by the network entity over the current connection, the network entity is to tell the UE that an extension of the tune away is to be deferred, e.g., by signaling to the UE a delta-timer.

In accordance with embodiments as described above when tuning away, the current connection transitions to the RRC_INACTIVE state.

In accordance with embodiments as described above the connections are in different states, the states including, for example, one or more of:
- an RRC_CONNECTED state,
- an RRC_INACTIVE state, and
- an IDLE state.

System

The present invention provides a wireless communication system, comprising:
- one or more UEs, and
- one or more network entities,
wherein one or more of the UEs comprises an inventive UE, and/or
wherein one or more network entities comprises an inventive network entity.

In accordance with embodiments as described above the UE comprises one or more of a mobile terminal, or stationary terminal, or cellular IoT-UE, or vehicular UE, or vehicular group leader (GL) UE, an IoT or narrowband IoT, NB-IoT, device, or a ground based vehicle, or an aerial vehicle, or a drone, or a moving base station, or road side unit, or a building, or any other item or device provided with network connectivity enabling the item/device to communicate using the wireless communication network, e.g., a sensor or actuator, and/or the network entity comprises one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

Method

The present invention provides a method for operating one or more wireless communication systems, wherein the one or more wireless communication systems comprise one or more user devices, UEs, and one or more network entities, like a gNB or another UE, wherein one or more of the UE include one or more transceiver chains, shares at least one transceiver chain with at least two connections to the one or more wireless communication systems, and is connected to one or more network entities, like a gNB or another UE, with the connections for performing one or more operations on the connections at respective operation occasions, and wherein the method comprises:

transmitting or receiving, by the UE, on a current one of the connections, while not transmitting or receiving on the other connections, receiving, at a network entity,
from a UE information about the one or more or all operation occasions associated with one or more or all of the other connections, and/or
from a UE or from one or more other network entities an indication of the operation occasions on one or some or all the connections, and/or
respective unique identifications of the connections, and responsive to the information and/or the indication and/or the unique identifications,
determining periods during which the UE is not available for the network entity, or
calculating or recalculating one or more operation occasions associated with the current connection to avoid clashes or overlaps or collisions with the operation occasions associated with the remaining connections.

The present invention provides a method for operating one or more wireless communication systems, wherein the one or more wireless communication systems comprise one or more user devices, UEs, and one or more network entities, like a gNB or another UE, wherein one or more of the UE include one or more transceiver chains, shares at least one transceiver chain with at least two connections to the one or more wireless communication systems, and is connected to one or more network entities, like a gNB or another UE, with the connections for performing one or more operations on the connections at respective operation occasions, and wherein the method comprises: transmitting or receiving, by the UE, on a current one of the connections, while not transmitting or receiving on the other connections, responsive to the UE tuning away from an operation on the current connection to perform an operation on another one of the at least two connections, providing a tune away signal, TAS, to the network entity, to which the UE is connected with the current connection.

The present invention provides a method for operating one or more wireless communication systems, wherein the one or more wireless communication systems comprise one or more user devices, UEs, and one or more network entities, like a gNB or another UE, wherein one or more of the UE include one or more transceiver chains, shares at least one transceiver chain with at least two connections to the one or more wireless communication systems, and is connected to one or more network entities, like a gNB or another UE, with the connections for performing one or more operations on the connections at respective operation occasions, the network entity being aware of the one or more operation occasions associated with one or more or all of the other connections, and wherein the method comprises: transmitting or receiving, by the UE, on a current one of the connections, while not transmitting or receiving on the other connections, using the knowledge about the one or more operation occasions, determining a UE tuning away from an operation on the current connection that is served by a network entity to perform an operation on another connection that is served by another network entity, and starting a timer or putting the current connection into a hold condition so as to avoid an error situation for the network entity.

The present invention provides a method for operating one or more wireless communication systems, wherein the one or more wireless communication systems comprise one or more user devices, UEs, and one or more network entities, like a gNB or another UE, wherein one or more of the UE include one or more transceiver chains, shares at least one transceiver chain with at least two connections to the one or more wireless communication systems, and is connected to one or more network entities, like a gNB or another UE, with the connections for performing one or more operations on the connections at respective operation occasions, and wherein the method comprises: transmitting or receiving, by the UE, on a current one of the connections, while not transmitting or receiving on the other connections, and receiving, at a the network entity, one or more tune away signals, TASs, the TAS indicating to the network entity that the UE tunes away from an operation on the current connection that is served by the network entity to perform an operation on another connection that is served by another network entity, and responsive to the TAS, starting, by the network entity, a timer or putting the current connection into a hold condition, by the network entity, so as to avoid an error situation for the network entity.

Computer Program Product

The present invention provides a computer program product comprising instructions which, when the program is executed by a computer, causes the computer to carry out one or more methods in accordance with the present invention.

Thus, embodiments of the present invention provide improvements and enhancements for the operation of multi-connection user devices, UEs, in one or more wireless communication systems. Embodiments of the present invention provide a user device, like a UE, for one or more wireless communication systems, which has one or more transceiver chains and shares at least one transceiver chain with at least two connections, also referred to as shared connections. to the one or more wireless communication systems. The UE may be connected, using the shared connections, to one or more network entities, like a gNB over the Uu interface, or to one or more other UEs over a sidelink interface, like one or more UEs in a D2D scenario, a V2X scenario, a V2V scenario. On the shared connections one or more operations may be performed by the UE at respective operation occasions. When the UE transmits or receives on a current one of the shared connections, the UE does not transmit or receive on the other shared connections. In other words, the UE, in accordance with embodiments of the present invention, is operated so make use of the shared connections which are kept in a state allowing to perform respective operations at certain occasions.

This is advantageous as it is not necessary to cut or disconnect the shared connections on which the UE does not transmit/receive thereby avoiding the need to perform a complete connection procedure in case of an operation to be carried out on the shared connections.

In accordance with embodiments, the UE may be configured or pre-configured by a network entity or by the network or be another UE to use the shared connections as described above, e.g., keeping some or all of the shared connections, i.e., also those on which the UE currently does not transmit/receive, in a state allowing to perform respective operations at certain occasions. In accordance with embodiments, the UE may be configured in this way by an application running on the UE or over-the-top (OTT). For example, the network entity or the network or higher layer manager may allow the use of the shared connections, e.g., certain combinations of shared may be allowed. For example, in one country, the multi-SIM or multi-operation capability may be allowed with 3 shared connections to the same or to different operators, while another country may allow 5 shared connections.

Keeping some or all of the shared connections in a state allowing to perform respective operations at certain occasions may include keeping some or all of the shared connections on which the UE currently does not transmit/receive, in one of the following states: RRC_CONNECTED, RRC_INACTIVE, and IDLE. It is noted that some or all of the shared connections may be kept or held in the same state or in different states.

Several aspects of the inventive approach shall now be described in more detail, however, it is noted that the respective aspects described below may be used individually or may be combined.

Aspect 1

In accordance with embodiments of the first aspect of the present invention, the one or more wireless communication systems are provided with information about the respective operation occasions, for example the respective instances in time at which certain operations are to be performed via the two or more connections that are shared by a RF transceiver chain of a multi-connection UE. The information about the respective occasions at which certain operations are to be connected via the two or more connections sharing the RF transceiver chain may be used to inform a network entity, to/from which the UE currently transmits/receives on the current connection, about instances at which the UE is not available for the network entity over the current connection. In addition or alternatively the information may be used by the network entity to avoid clashes or overlaps or collisions of one or more or all operation occasions associated with the current connection with respective operation occasions associated with the remaining connections.

In accordance with embodiments, the UE may signal to the network entity, to/from which it is transmits/receives on the current connection, the information about the one or more operation occasions associated with one or more or all of the other connections. In accordance with other embodiments, the UE may, instead of in addition to the previously described embodiment signal an indication from which the operation occasions on one or some or all the connections are derivable, e.g., by the one or more network entities. For example, the indication may include a device identifier, the device identifier being unique for each UE in the wireless communication system and being associated with identifications of the connections, so as to indicate that the UE provides the at least two connections, and/or identifications of one or more or all of the connections, so as to indicate that the UE provides the at least two connections.

Embodiments of the first aspect of the present invention will now be described in more detail with reference to the reading of a paging channel during a paging occasion, however, the skilled person will readily understand that the subsequently described embodiments are equally applicable for other operations, like the operations summarized above. Further, in the subsequent description of embodiments of the first aspect of the present invention, it is assumed that the multi-connection UE identifies the respective connections that share a common RF transceiver chain by respective SIM cards. However, the inventive approach is not limited to such embodiments, rather, the skilled person will readily understand that the respective connections may be identified by any of the identifications mentioned above, for example by a eSIM, a certificate or a pair of username and password.

Figure 3:
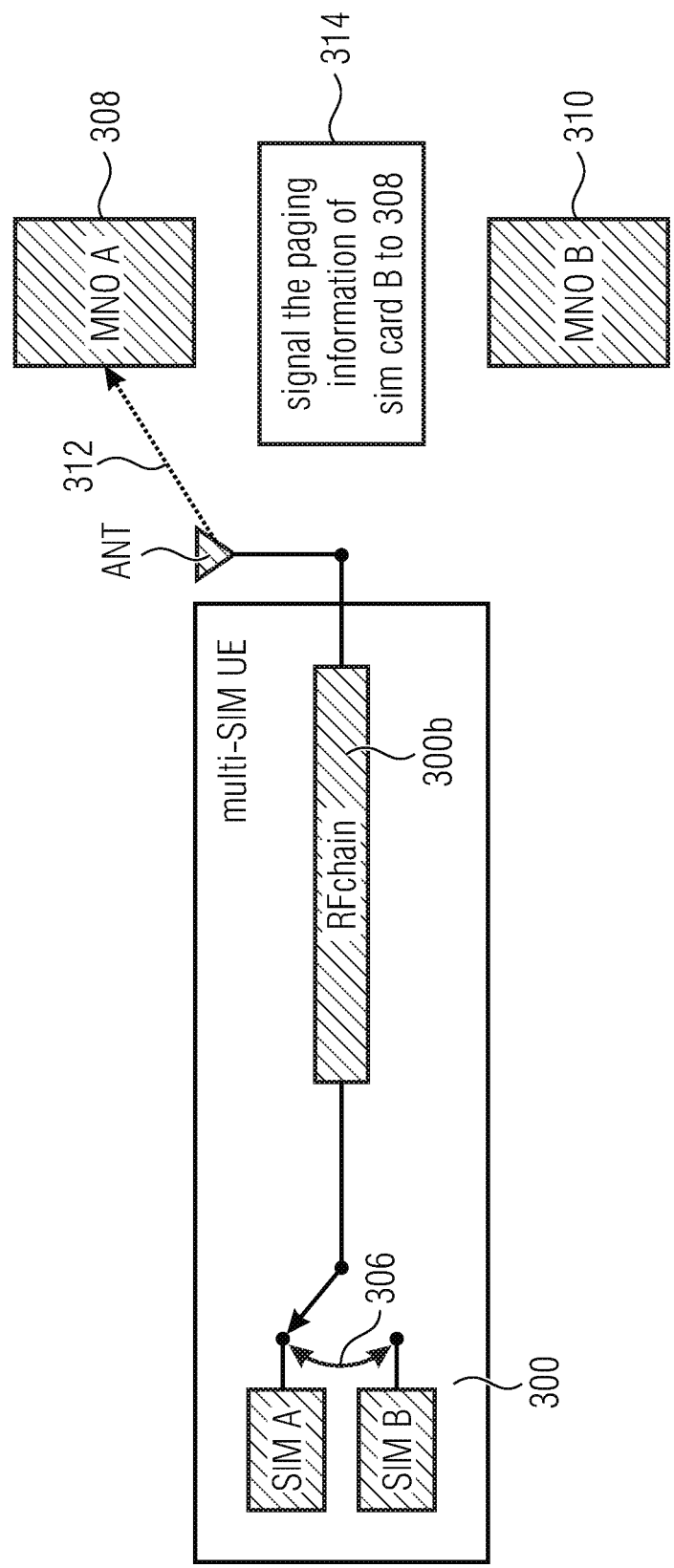
FIG. 3 illustrates an embodiment of a multi-connection UE identifying towards a network entity operation occasions of respective connections sharing an RF chain of the UE.

FIG. 3 illustrates an embodiment of a multi-connection UE 300 identifying the respective connections using respective SIM cards SIM A and SIM B. Thus, the multi-connection UE 300 may also be referred to as a multi-SIM UE. The multi-SIM UE 300 of FIG. 3 is assumed to include a single RF chain or RF transceiver chain 300*b*, however, in accordance with other embodiments the multi-SIM UE 300 may include two or more RF transceiver chains. In the embodiment of FIG. 3 it is assumed that the RF transceiver chain 300b is shared among the two connections identified by SIM card A and SIM card B, respectively. As is schematically indicated at 306, the multi-SIM UE 300 selects one of the connections SIM A or SIM B to be connected to the RF transceiver chain 300b for transmitting/receiving on one of the connections via the antenna ANT that is connected to the RF transceiver chain. As mentioned above, the antenna may be a single antenna or the UE may include a plurality of antennas or an antenna array.

To address the above-discussed issues regarding overlapping operation occasions, for example overlapping paging occasions, in accordance with embodiments of the first aspect the paging information of all connections is provided to the network. The multi-SIM UE 300 is aware of the paging occasions associated with the first connection SIM A and the second connection SIM B. In the embodiment of FIG. 3, the first connection SIM A is currently connected to the RF transceiver chain 300b for transmitting/receiving to/from the network. The connection SIM A is also referred to in the following as the current connection, i.e., the connection on which the UE currently transmits to/receives from the network entity. The connection SIM B, which shares the RF transceiver chain with the connection SIM A, is not active, for example is in the idle state or in the inactive state or in the RRC connected state, and is referred to in the following as the other connection, i.e., on which the UE currently does not transmit to/receive from the network entity. The multi-SIM UE is capable of connecting to a first network entity 308 using the first connection SIM A, and to a second network entity 310 using the second connection SIM B. The network entities 308, 310 may be base stations or, in case of a sidelink communication, another user device. It is further assumed that the network entities 308, 310 belong to different mobile network operators. Network entity 308 belongs to MNO A, while network entity 310 belongs to MNO B.

In the embodiment depicted in FIG. 3, the multi-SIM UE 300 is transmitting to/receiving from the network entity 308 using the current connection SIM A, as is schematically indicated at 312. The multi-SIM UE 300, which is aware of the paging occasions of all connections, may signal the paging information of all other connections to the network entity 308. As is schematically indicated at 314, via the active connection 312, the UE 300 signals the paging information of the other connection SIM B, also referred to as the paging information of SIM card B, to the network entity 308. In addition, the network entity 308 already knows the paging information of SIM card A because when connecting or attaching to the network entity 308 using the current connection SIM A, for example by means of the signaling of the UE capabilities, the paging information of the current connection SIM A is also provided to the network entity 308. Thus, network entity 308 has the signal information about all connections sharing the RF transceiver chain 300b of the multi-SIM UE 300. The network entity 308, using the information of the respective connections may calculate or recalculate the paging occasions for the current connection SIM A so as to avoid any overlap, clash or collision with the paging occasions associated with the other connection SIM B.

In case the current connection is the second connection SIM B, the same procedure may be employed. More specifically, in this case, the network entity 310 may be already aware of the paging information for SIM card B which may be received, for example, when attaching to the network entity 310 via the UE capability information. The UE may also transmit the paging information of SIM card A to the network entity 310 thereby allowing the network entity 310 to calculate/recalculate the POs for the second connection SIM B which, in this scenario, is the current connection, so as to avoid any clash, overlap or collision with paging occasions associated with the other connection SIM A.

In the embodiment described above with reference to FIG. 3 it has been assumed that the UE 300 provided the paging information about the SIM card which is currently connected to the network entity when connecting to the network entity, for example using the UE capability information, and that the paging information of the other connection SIM B is provided at some other time to the entity 308. However, in accordance with other embodiments, the UE 300, when attaching to or connecting to the network entity over a current connection may signal the paging information of the other connections, like the paging information of SIM card B together with the paging information of the current connection SIM A as part of the UE capability information. Thus, the signaling at 312 in FIG. 3, in accordance with embodiments, may be a signaling after the UE 300 is connected to the network entity 308 via the current connection so as to signal the paging information of the other connections, while in accordance with other embodiments at 312 the UE capability may be transmitted that includes besides the paging information of the current connection SIM A also all paging occasions of the other connections, like connection SIM B.

In accordance with further embodiments, the UE may include a device identifier that is transmitted to the network entity, for example at 312 in FIG. 3, and the device identifier is unique for each UE in the wireless communication system. The device identifier, further, is associated with the identifications of the connections, thereby indicating that the UE 300 provides at least the two connections SIM A and SIM B. In other words, when the UE indicates, for example, its multi-SIM capability, also the device identifier is transmitted which is unique for each device but stays the same among the different SIM cards of the same device so as to allow the network entity to match the two or more SIM cards, for example in case they are provided by different mobile network operators.

In accordance with yet other embodiments, the UE may transmit the above-mentioned identification of one or more or all of the other connections, for example of connection SIM B, so as to indicate that the UE provides the at least two connections. In other words, the UE may transmit the UE-IDs used for the other SIM cards or only for those of the same network operator instead of transmitting the device ID which allows the network to match the two connections that appear to the network as two different UEs, so as to adjust the respective operation occasions, like the POs, accordingly.

Thus, the information or the indication informs the one or more network entities about instances at which the UE is not available for the network entity, or allow the one or more network entities to avoid clashes or overlaps or collisions of one or more or all operation occasions associated with the current connection with the operation occasions associated with the remaining connections.

In accordance with embodiments, the respective connections that share the RF transceiver chain, like connection SIM A and SIM B in FIG. 3 above, may be ranked or prioritized. The UE 300 may signal to the network entity, for example 308 in FIG. 3, only information about operation occasions, like paging occasions, that are associated with another connection that has a rank or a priority that is the same or that is higher than the rank or priority of the current connection. For example, when considering a UE having three connections identified by respective SIM cards, a primary SIM card, a secondary SIM card and tertiary SIM card may be defined. In such an embodiment, when assuming that the secondary SIM card provides for the current connection to the network entity, the UE may signal to the network entity, like entity 308 in FIG. 3, only the paging information of the primary SIM card but not the paging information of the tertiary SIM card, so that the network entity 308 may calculate/recalculate the paging occasions for the current connection associated with the secondary SIM card based on the paging information of the primary SIM card so as to avoid collisions of the paging occasions associated with the secondary SIM card with paging occasions of the primary SIM card. Likewise, in case the current connection is provided by the tertiary SIM card, the paging information of the primary SIM card and the paging information of the secondary SIM card is transmitted to the network entity so as to allow the network entity to calculate/recalculate the paging occasions of the tertiary SIM card based on the paging information of the primary and secondary SIM cards.

The rank or priority of a connection may be decided or determined by the UE, or by a network entity, or by an over-the-top, OTT, application.

Thus, embodiments of the first aspect of the present invention address the problem of potentially overlapping operation occasions of connections sharing a RF transceiver chain of a multi-connection UE. The network entity to which the UE is connected via a current connection is provided with information about the respective operation occasions of the other connections so as to allow the current network entity to determine periods during which the UE is not available for the network entity and/or to calculate/recalculate or arrange/rearrange the operation occasions of the current connection so as to avoid clashes, collisions or overlaps. This approach is advantageous as it avoids delays in obtaining the information at the respective operation occasions, thereby reducing or avoiding delay or loss of data on any one of the connections. The information about the respective operation occasions may be information from the UE about the one or more or all operation occasions associated with one or more or all of the other connections, and/or may be an indication from the UE or form one or more other network entities from which the operation occasions on one or some or all the connections may be derived, and/or may be associated with respective unique identifications of the shard connections.

In accordance with further embodiments, the UE 300 in FIG. 3 may switch to the second connection SIM B, for example at a certain time, so as to also inform the network entity 310 about the paging information of the SIM card A so to allow also the network entity 310 to calculate/recalculate the paging occasions to avoid clashes, overlaps or collisions.

In accordance with embodiments, the network entity, like entity 308, that receives the paging information may extend a timer for declaring a radio link failure, RLF, at least by a duration of a period during which the UE is not available, because it is transmitting to/receiving from another network entity using another one of the connections, or by a duration of the operation occasions associated with the other connections. The network entity 310, being aware of the times at which the UE is not available due to performing certain operations on the other connections, may not schedule any data for the UE while a duration of a period during which the UE is not available or while a duration of operation occasions associated with the other connections.

Aspect 2

In accordance with embodiments of the second aspect of the present invention, the above-discussed issue regarding service interruptions is addressed by keeping the system informed about a situation in which a UE tunes away from a current connection so as to perform an operation on another one of the connections sharing the same RF transmitter chain as the current connection at a certain operation occasion.

Figure 4:
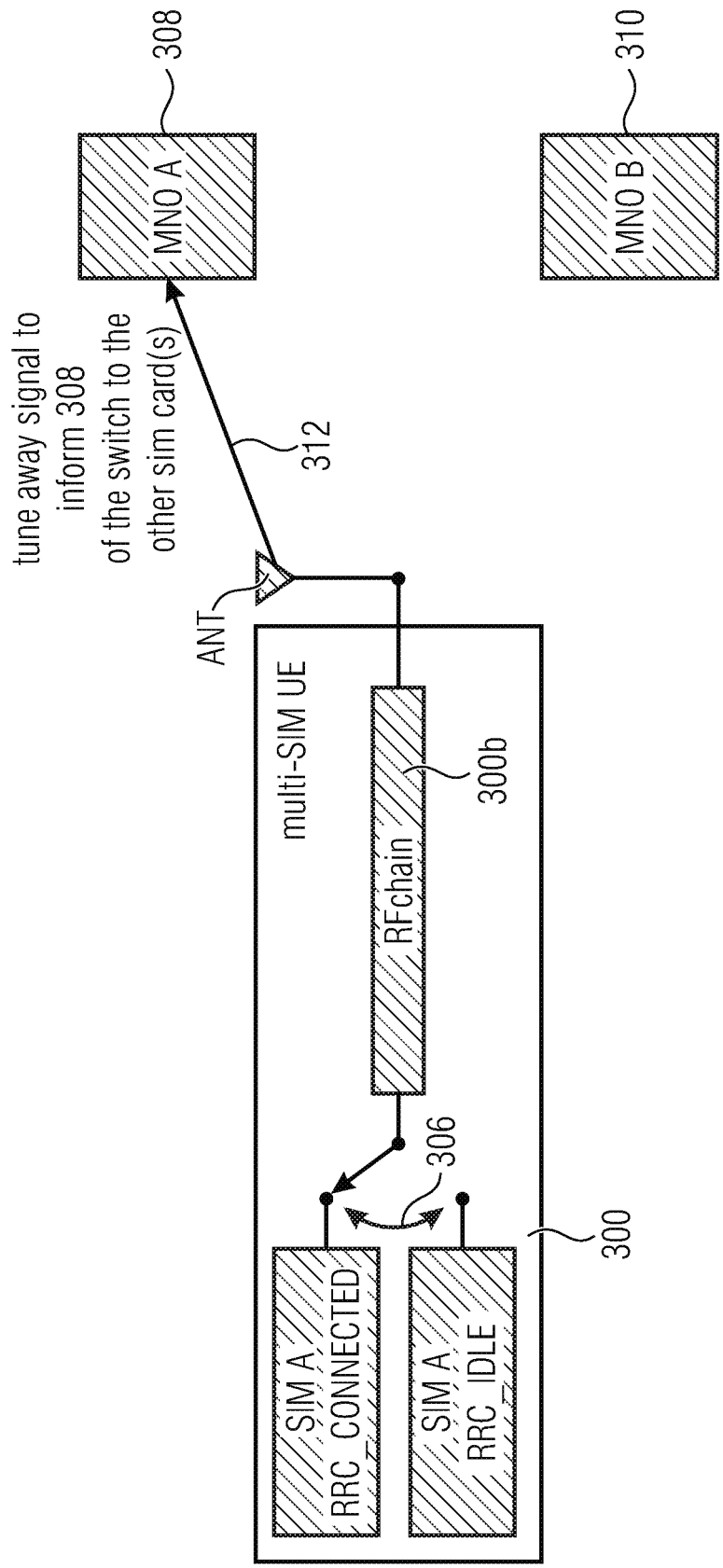
FIG. 4 illustrates an embodiment employing a tune away signal which is signaled to a serving network entity before switching to one or more operations on another connection.

FIG. 4 illustrates an embodiment employing a tune away signal that is signaled to a serving network entity before switching to one or more operations on another connection. In a similar way as in FIG. 3, the UE 300 is depicted which identifies the respective connections using SIM cards A and B, so that a first connection may be referred to as connection SIM A and a second connection may be referred to as connection SIM B. Again, a single RF transceiver chain 300B is illustrated, however, the UE 300 may include more than one RF transceiver chain. The transceiver chain 300*b* is shared by the two connections SIM A and SIM B, and the UE may switch between the two connections as illustrated at 306 so as to transmit/receive using the first connection SIM A or the second connection SIM B. In the depicted embodiment of FIG. 4 it is assumed that the connection SIM A is in the RRC connected state, i.e., is the connection that is connected to the network entity 308 via the antenna 110 as is indicated at 312. Thus, connection SIM A may also be referred to as the current connection on which the UE currently transmits to/receives from the network entity, and connection SIM B, which is in the RRC idle state or in the RRC inactive state may be referred to as the other connection on which the UE currently does not transmit to/receive from the network entity. In the embodiment of FIG. 4 it is assumed that the second connection SIM B, the other connection, is for a connection to another network entity 310 in a similar way as described above with reference to FIG. 3. The network entity 308 may also be referred to as the serving network entity as it has the current connection to the UE 300. In accordance with embodiments of the second aspect, to keep the serving network entity 308 informed about a tune away situation, the UE 300 transmits a tune away signal, TAS, to inform the network entity 308 of the switching to the other SIM card SIM B. The UE 300 is aware of situations in which one may switch to the second connection SIM B, for example in case a paging channel needs to be read by the second connection SIM B or in case of any of the other operations mentioned above is to be performed.

The tune away signal informs the network entity 308 that the UE which is currently served by the network entity 308 over the current connection is switching, for example for a certain period of time, to another connection and, therefore, may not be reachable or available for the UE 308. This knowledge at the network entity is advantageous as it allows the network entity to handle the interruption and to consider it as a service interruption and to avoid any unexpected behavior. For example, the network entity may extend a timer for declaring the radio link failure, RLF, responsive to the tune away signal and responsive to the knowledge about the duration of the tune away situation. In accordance with further embodiments, the network entity 308 does not schedule data for the UE during a certain duration after receiving the tune away signal.

In accordance with embodiments, the tune away signal may include an indication of the operation the UE turns to and/or a time the UE is tuned away from the operation on the current connection. For example, the TAS may include x bits that indicate $2^x$ states. For example, the states may indicate the type of operation, like a first type operation having a first length being shorter than a length of the second type operation. The short type operations may include, for example, a paging operation, a measurement operation or a TA update. The long-type operation may include a call or a data transfer/connection that takes more time than a simple paging operation, for example. Further, the TAS may indicate the actual time the UE is tuned away from the current connection, for example, it may indicate a time of 2 ms, 5 ms, 100 ms or longer.

In accordance with further embodiments, an operation on the other connection, to which the UE tuned away, may take more time, e.g., more time than a predefined amount of time as defined or indicated, e.g., by the TAS. In such a situation the UE may inform the network entity of the current connection that the tune away duration is longer than a tune away duration defined for the TAS. For example, in case the indication is provided at the time of tuning away or in response to receiving further information on the operation from the other connection, to which the UE tuned away, that the operation on the other connection is to take more time, the UE may send or signal a so-called long tune away signal, Long TAS, to the network entity of the current connection. In case the indication is provided at some time while the UE is tuned away, the UE may send or signal a so-called TAS update to the network entity of the current connection. For example, the additional information may indicate, via a paging occasion, that a call is to be received, or an indication may be received that data is about to be sent to the UE, or an indication may be received that some kind of high priority operation needs to be performed by the UE over the other connection. In accordance with embodiments, responsive to the long tune away signal, the UE may switch the current connection into to an inactive state, and once the operation on the other connection is completed, the UE may signal to the network entity a return signal or RACH informing the network entity 308 that the tune away state is now over and that the connection of the UE returns to the original current connection.

When considering the embodiment of FIG. 4, initially the current connection is connection SIM A, however, some operation needs to be carried out on connection SIM B, so that the tune away signal is signaled on the current connection to network entity 308 informing this network entity that the UE will not be available on the current connection for a certain period. Then, the second connection SIM B is switched to the RF chain 300b so as to connect to the network entity 310. At this time, the current connection may transition, in accordance with embodiments, into the RRC inactive state. Prior to tuning away the second connection may inform the UE about the kind and/or length of the operation to be carried out so that the TAS may include the additional information mentioned above so as to inform the network entity 308 in more detail about the period during which the UE is not available.

The resources for the TAS may be preconfigured and sent in an RRC configuration/reconfiguration message to the UE 300 or the resources may be dynamically assigned as a part of a resource assignment during the RRC connected state.

The provision of the TAS is advantageous as it helps the network entities to understand the behavior of the multi-SIM or multi-connection UE 300 so as to deal with situations in which the UE, which is actually served by the network entity 308, is not reachable due to the time taken to perform the one or more operations on the other connections, like cell selection/reselection, paging, system information and tracking/routing area update, SPS transmissions, CG transmissions or measurements.

Aspect 3

In accordance with embodiments of a third aspect of the present invention, to reduce or avoid any uncertainties with regard to the multi-connection UE behavior in terms of service interruption, as explained above, a timer and/or a hold condition is provided.

In accordance with embodiments, a network entity, like the network entity 308 illustrated to FIGS. 3 and 4, may be aware of the one or more occasions associated with the other connections during which certain operations on the other connections are to be performed.

For example, when considering FIG. 3 and the above-described first aspect of the present invention, by providing the currently serving network entity 308 with the information about the operation occasions of the other connections sharing the same RF transmitter chain, the network entity 308 is aware of the one or more operation occasions associated with the other connections, and on the basis of this knowledge the network entity may be aware about occasions or instances in time at which the UE, that is currently served by the network entity, tunes away from the network entity for a certain period of time or temporarily so as to perform the operation on another one of the other connections. Based on this knowledge, the network entity knows that the UE only temporarily tuned away from the network entity and, when such a time instance or occasion is recognized by the network entity, in accordance with embodiments, the network entity 308 may start the timer and/or may put the current connection into a hold condition so as to avoid an error situation for the network entity 308. In a similar way, when considering the second aspect and the embodiment described above with reference to FIG. 4, the network entity 308 is made aware of the tuning away by receiving the tune away signal, in such embodiments, the network entity may start the timer and/or put the current connection into the hold condition responsive to receiving the tune away signal.

Thus, in accordance with embodiments using the tune away timer, $T_{tune\_away}$, uncertainties in the multi-connection UE behavior at the network entity to which it is currently connected to, may be avoided. In accordance with embodiments the range of the timer may incorporate the switching time across the one or more other connections plus the processing time for the data received over the other connections. In accordance with embodiments, during the time as set by the tune away timer, the network entity does not schedule any data for the multi-SIM UE over the current connection from which the UE is temporarily tuned away. The length of the timer, in accordance with embodiments, may depend on one or more of the UE capabilities, and on the time taken to perform the one or more operations on the other connections, like a cell selection/reselection, like a paging, like a system information and dragging/routing area update, like a SPS transmission, like CG transmission, and like a measurement to be performed on the other connection.

In accordance with further embodiments of the present invention, to avoid issues or problems with the above-described service interruption, the network entity may place the current connection or the RRC connected connection of the multi-connection UE into a hold condition. For example, in case the multi-connection UE has a current connection that is an RRC connected state with a network entity and has to tune away to another connection, either based on the dynamic signaling (see the second aspect, TAS) or based on the knowledge of the other operation occasions (see the first aspect), the serving network entity may place the current connection of the UE in a hold condition. The advantage of the hold condition is that the core network maintains the context of the current connection of the UE and, at the same time, may also reuse some or all of the resources assigned to the current connection for other UE(s) served by the network entity. This improves the management of the resources and allows for a more efficient use of the available resources at the network entity. In case the network entity also starts the tune away timer $T_{tune\_away}$, the network entity may keep the current connection in the hold condition for the time duration of the tune away timer, and the lengths of the timer may be adjusted based on certain requirements.

Figure 5:
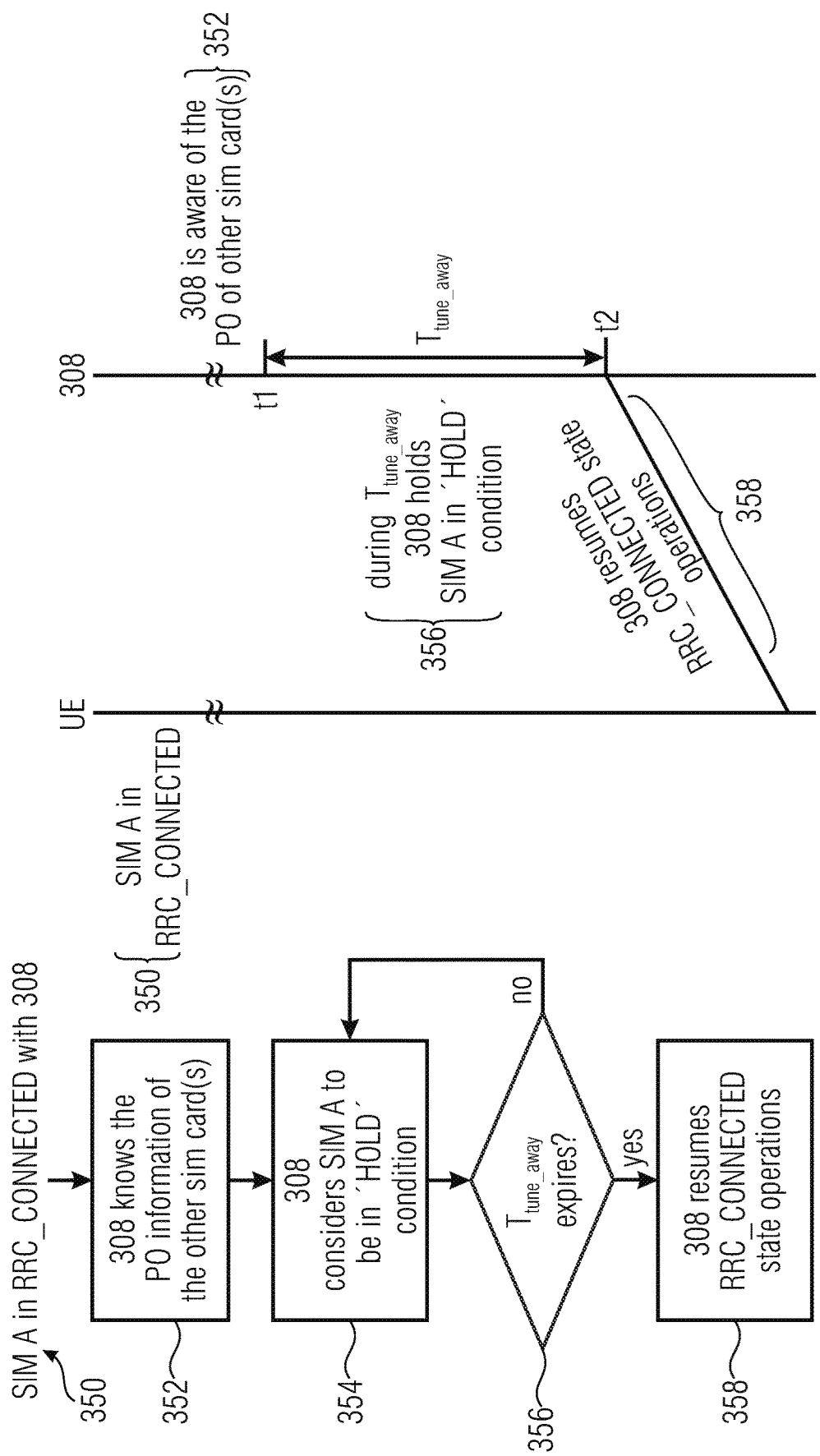
FIG. 5 illustrates an embodiment of the third aspect of the present invention placing a current connection of a multi-connection UE into a hold condition based on the network entity's knowledge about the certain operation occasions on the other connections without using a tune away signal.

FIG. 5 illustrates an embodiment of the third aspect of the present invention placing a current connection of a multi-connection UE into a hold condition based on the network entity's knowledge about the certain operation occasions on the other connections without using a tune away signal. FIG. 5 illustrates the embodiment with reference to a paging occasion, however, the skilled person will readily recognize that the principles described herein may be equally applied to any other operation occurring on the other connections, like the operations discussed and described above. Initially, as is illustrated at 350 a situation as depicted, for example, in FIG. 3 is assumed, i.e., the first connection SIM A is the current connection that is in an RRC connected state with the network entity 308. The UE 300 provided the network entity 308 with the paging occasions of the other connections, like the connection SIM B, so that, as is indicated at 352 the network entity knows the PO information of the other SIM cards or other connections. At 354, the network entity 308, based on its knowledge about the PO information of the other SIM cards, knows that at a time $t_1$ indicated in the right hand part of FIG. 5, a paging operation needs to be carried by the other connection SIM B so that the UE 300 switches the second connection SIM B to the RF chain 300b for a connection to the network entity 310. At the time $t_1$ the network entity 308 places the first connection SIM A in the hold condition and starts the tune away timer $T_{tune\_away}$ that is monitored as is indicated at 356. As long as the timer did not expire, the first connection SIM A is maintained in the hold condition. Once the timer expired at $t_2$, as indicated in the right hand part of FIG. 5, the network entity 308, as is indicated at 358, resumes the RRC connected state operations using the initial or first connection SIM A. For example, the UE connects the first connection or current connection SIM A again to the RF chain 300b.

Figure 6:
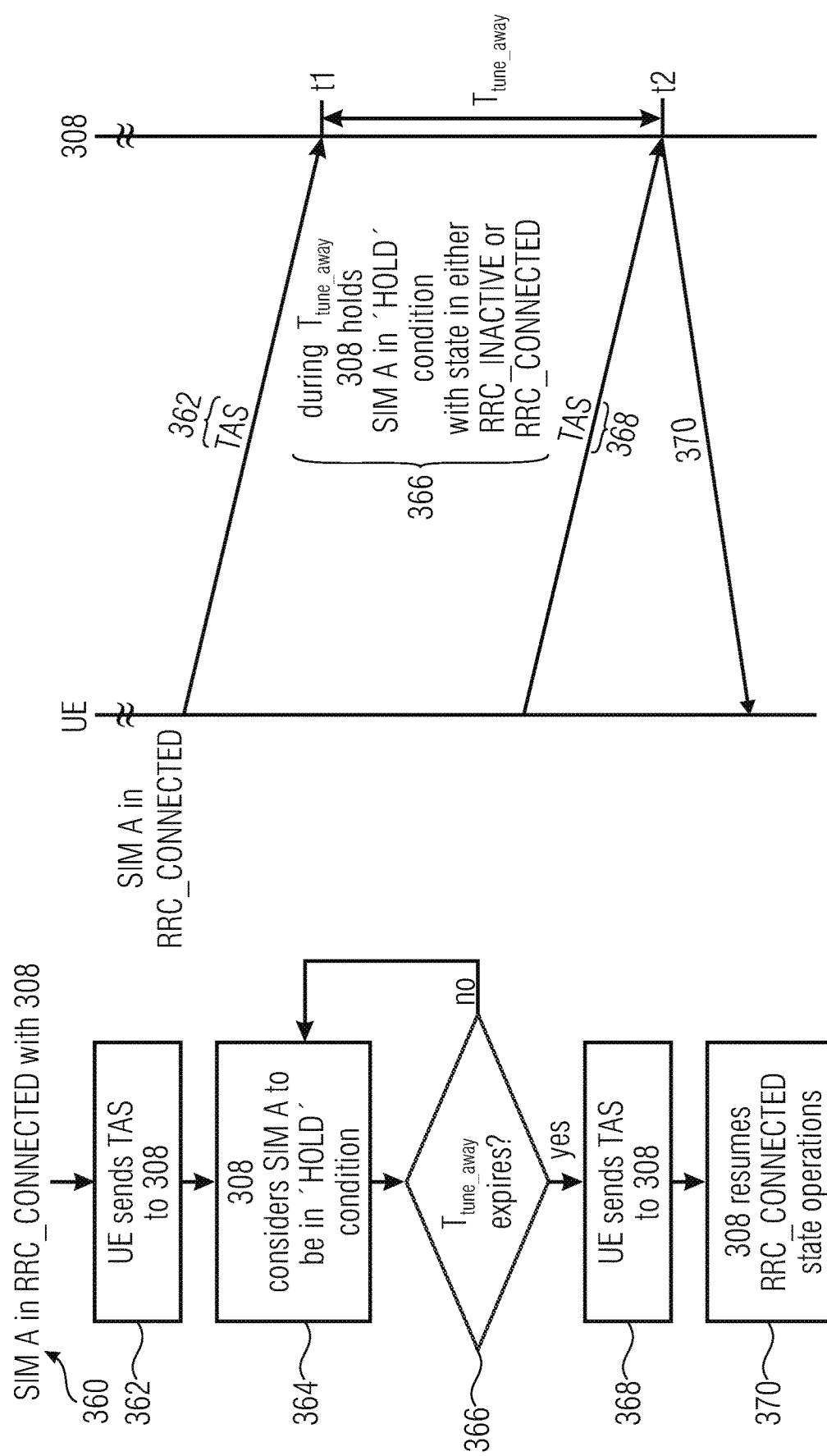
FIG. 6 illustrates a further embodiment of the third aspect of the present invention employing the hold condition and the tune away timer responsive to the tune away signal.

FIG. 6 illustrates a further embodiment of the third aspect of the present invention employing the hold condition and the tune away timer responsive to the tune away signal. In FIG. 6, in a similar way as in FIG. 5, an initial situation, as indicated at 360, is assumed in which, for example, as described with reference to FIG. 4, the first connection SIM A is the current connection that is RRC connected with the network entity 308. Responsive to recognizing that an operation needs to be performed on the other connection SIM B, the UE, as is indicated at 362, sends the TAS to the network entity 308 so that, at time $t_1$, the network entity 308, as indicated at 364, considers the current connection SIM A to be in a hold condition and, at the same time, the tune away timer $T_{tune\_away}$ is started. The tune away timer is monitored, and during the timer the network entity 308 holds the current connection in the hold condition, for example, in an RRC inactive state or in an RRC connected state until the timer expires at $t_2$. Responsive to the expiry of the tune away timer at $t_2$ the network entity 308 may resume the operation over the initial connected connection SIM A, as is indicated at 370. In other words, according to an embodiment, when the tune away timer expires, the previously connected network entity may continue scheduling to the multi-connection UE 300 and may expect configured uplink transmissions from the UE on the current connection SIM A, such as PUCCH and CG.

In accordance with other embodiments, rather than immediately resuming operation on the initial current connection SIM A, on the expiry of the tune away timer, the multi-connection UE may signal the tune away signal again to the network entity 308 to which it was connected with the current connection SIM A before tuning away so as to indicate that it has returned from the tuned away state so that the network entity may continue scheduling using the connection SIM A responsive to the receipt of the second TAS, as is indicated in FIG. 6 at 368.

The resources for the tune away signal may be consistent during the hold condition and may be used to transmit the tune away signal again at the expiry of the tune away timer.

In accordance with embodiments, while being in the hold condition, the network entity 308 does not expect any configured uplink transmissions from the UE using the connection SIM A, such as PUCCH, PUSCH or CG.

In accordance with further embodiments of the third aspect of the present invention, a hold condition expiry timer, $T_{hold\_exp}$ may be provided that starts at the end of the tune away timer. This timer may define a period, like $T_{hold\_exp}$, during which the network entity 308 that served the previous current condition from which the UE temporarily turned away, maintains the context of the multi-connection UE. At the expiry of this further timer, the previously serving network entity 308 may declare a radio link failure, RLF, and may continue with an RLF recovery procedure. The additional hold condition expiry timer may be employed in the embodiment described above with reference to FIG. 6 at the end of the tune away time and is applicable both for the situation in which the additional TAS is transmitted or in which the additional TAS is not transmitted at 368.

Figure 7:
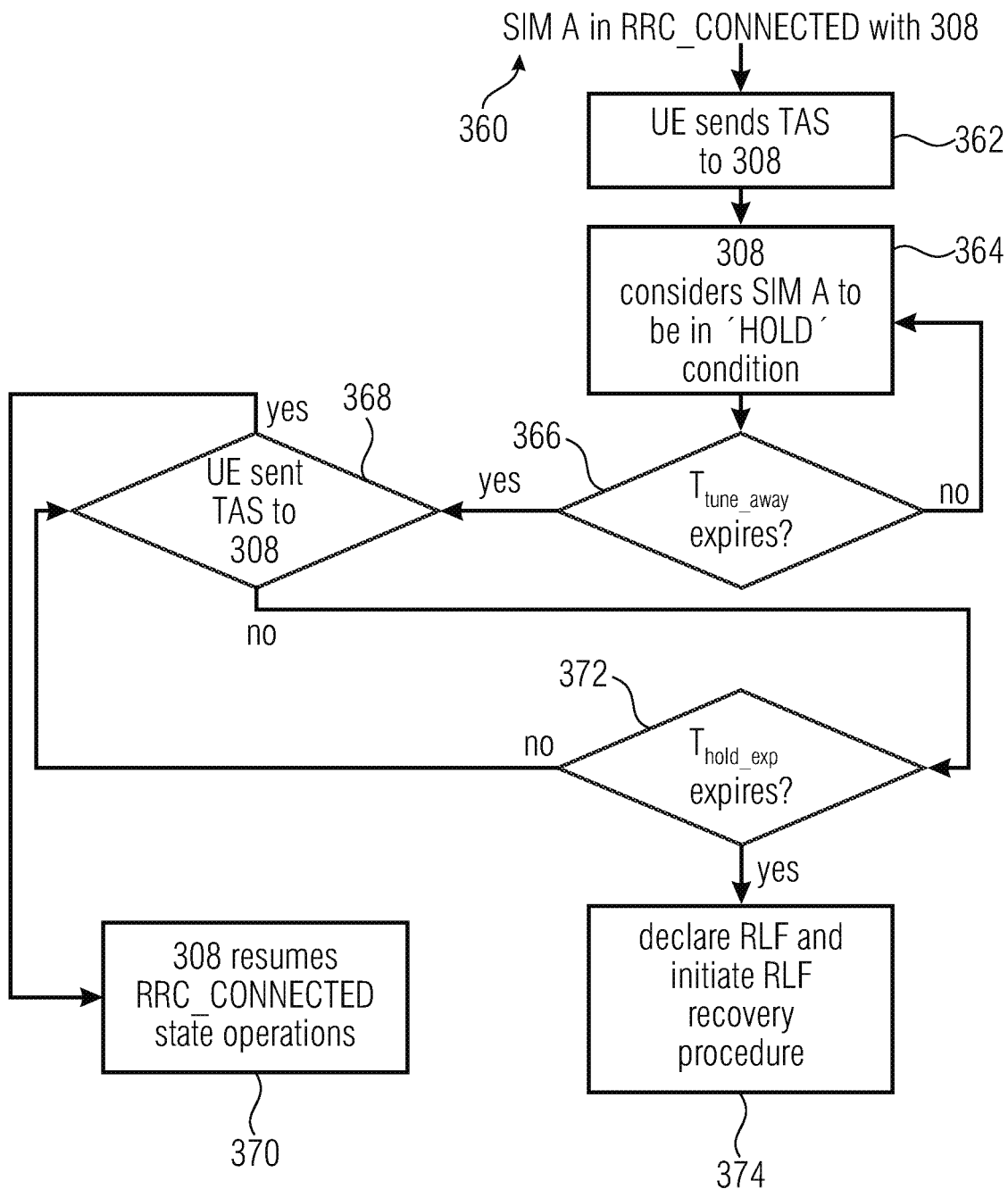
FIG. 7 is a flowchart illustrating an embodiment in which the hold condition expiry timer is employed.

FIG. 7 is a flowchart illustrating an embodiment in which the hold condition expiry timer is employed in a scenario in which, following the expiry of the tune away timer a further TAS is received from the UE to signal that the UE returned to the initial current connection SIM A. Initially, in a similar way as in FIG. 6, also in FIG. 7 the first connection SIM A is considered to be RRC connected with the network entity 308 as indicated at 360. Also blocks 362 to 366 are the same as in FIG. 6, however, at the expiry of the timer at 366 the hold condition expiry timer is started and, at 368, it is determined whether the UE has sent the TAS to the network entity 308. If not, it is checked at 372 whether the hold condition expiry timer expired. If not, the flow returns to 368 to determine whether the UE sent to the TAS. In case the UE sent the TAS the network entity resumes the connection to the UE as indicated at 370 as described above with reference to FIG. 6. In case the hold condition expiry timer expires before the UE has sent the TAS, the flow goes to 374 where the radio link failure is declared and a radio link failure recovery procedure is started.

In accordance with further embodiments, when considered the above described situation that a certain operation carried out on the other connection take more time than expected, the tune away timer $T_{tune\_away}$, the hold condition and/or the hold condition expiry timer, $T_{hold\_exp}$, may be handled differently. As mentioned above, in case a the tune away duration is longer than a tune away duration defined for the TAS, the above described long tune away signal, Long TAS or the TAS update may be received. In case the long tune away signal or the TAS update is received within the duration of the tune away timer $T_{tune\_away}$, and in case only the tune away timer is used (no hold condition), the network entity stops the tune away timer. In case the network entity only uses the hold condition (no tune away timer is started), the network entity removes the hold condition. In case the network entity uses both the tune away timer and hold condition, the network entity stops the tune away timer and removes the hold condition. Further, in case the hold condition expiry timer is used, the network entity to stops the hold condition expiry timer removes the hold condition.

In accordance with further embodiments, responsive to the TAS, in case of a predefined situation, e.g., the delivery of an important message by the network entity over the current connection, the network entity is to tell the UE that the tune away is to be deferred, e.g., by signaling to the UE a delta-timer. In a similar was, responsive to the long tune away signal or to the TAS update, in case of a predefined situation, e.g., the delivery an important message by the network entity over the current connection, the network entity is to tell the UE that an extension of the tune away is to be deferred, e.g., by signaling to the UE a delta-timer.

In accordance with further embodiments of the present invention, when tuning away from a current connection, a transition of the current connection to the RRC inactive state may be enabled once the multi-connection UE has tuned away to cater to the services or operations on one or more of the other connections. The UE may issue the tune away signal using the current connection while being in the RRC connected state and transition the current connection to the RRC inactive state, for example for performing the operations, like reading paging occasions, on the other connections.

The hold condition may also be valid in the RRC inactive state and may deprioritize some of the inactive state procedure when in the hold condition. While being in the RRC inactive state, the UE may use the above-described timers and may cause the initial current connection to transition back to the RRC connected state once the operation is terminated, for example once a PO scanning timer has expired. In accordance with other embodiments, since the RRC context is still established in the RRC inactive mode, the UE may acquire SIBs and also demand SIBs from a base station over the initial current connection SIM A which may be used by the gNB or the network entity 308 to pull the initial connection SIM A back into the RRC connected state.

General

Embodiments of the present invention have been described in detail above, and the respective embodiments and aspects may be implemented individually or two or more of the embodiments or aspects may be implemented in combination.

With regard to the above-described embodiments of the various aspects of the present invention, it is noted that they have been described in an environment in which a communication is between a transmitter, like a gNB or a UE, and a receiver, like a UE and a gNB. However, the invention is not limited to such a communication, rather, the above-described principles may equally be applied for a device-to-device communication, like a D2D, V2V, V2X communication. In such scenarios, the communication is over a sidelink between the respective devices. The transmitter is a first UE and the receiver is a second UE communicating using the sidelink resources.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 8:
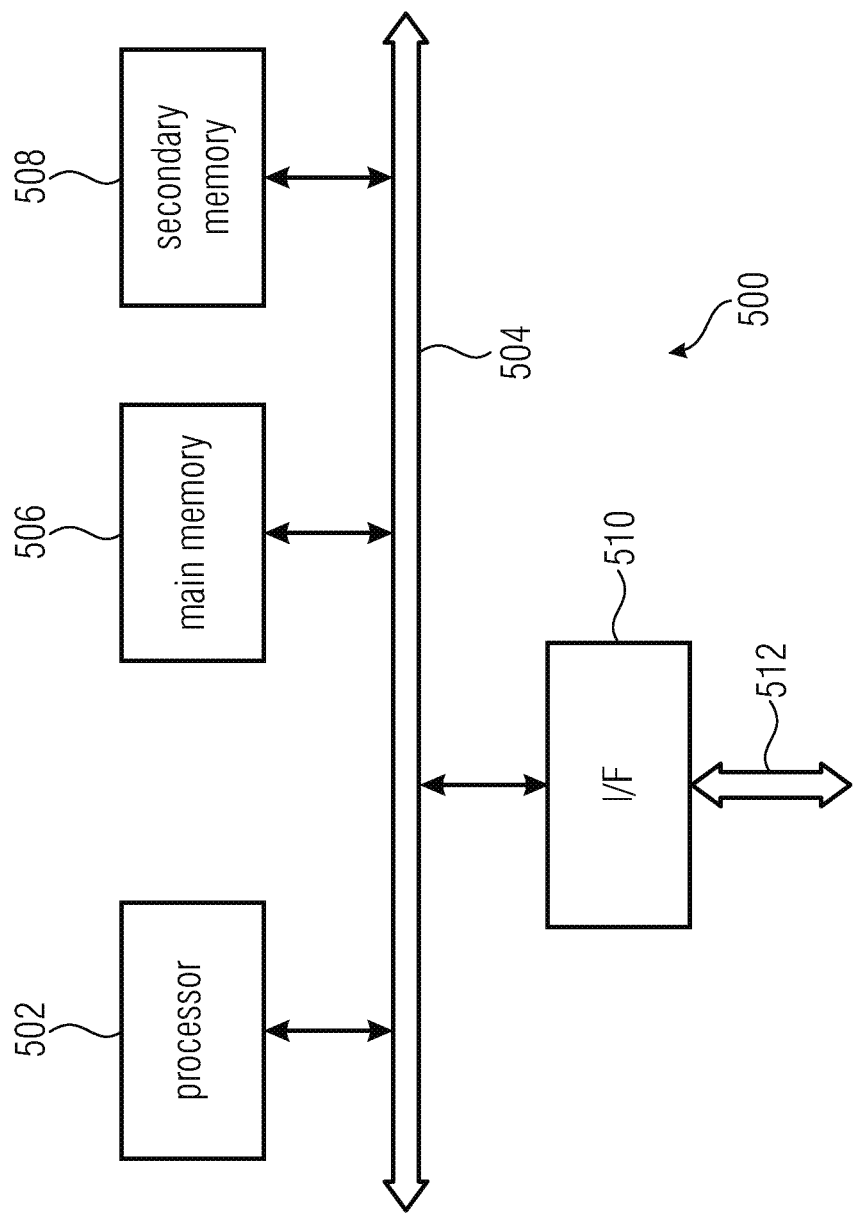
FIG. 8 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 8 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may reprepresent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

List of Acronyms and Symbols
BS Base Station
   CBR Channel Busy Ratio
   D2D Device-to-Device
EN Emergency Notification
   eNB Evolved Node B (base station)
FDM Frequency Division Multiplexing
   LTE Long-Term Evolution
   PC5 Interface using the Sidelink Channel for D2D communication
   PPPP ProSe per packet priority
PRB Physical Resource Block
   ProSe Proximity Services
RA Resource Allocation
   SCI Sidelink Control Information
   SL sidelink
   sTTI Short Transmission Time Interval
TDM Time Division Multiplexing
   TDMA Time Division Multiple Access
   TPC Transmit power control/transmit power command
UE User Entity (User Terminal)
   URLLC Ultra-Reliable Low-Latency Communication
   V2V Vehicle-to-vehicle
   V2I Vehicle-to-infrastructure
   V2P Vehicle-to-pedestrian
   V2N Vehicle-to-network
   V2X Vehicle-to-everything, i.e., V2V, V2I, V2P, V2N

The invention claimed is:

1. A device comprising:
at least one transceiver chains;
   wherein the at least one transceiver chains have a plurality of connections to at least one wireless communication systems,
   wherein the device is connected to at least one network entities using the plurality of connections,
a processor circuit; and
a memory circuit, wherein the memory is arranged to store instructions for the processor circuit,
wherein the processor circuit is arranged to perform at least one operations on the plurality of connections at operation occasions,
wherein the processor circuit is arranged to transmit or receive on a first connection of the plurality of connections,
wherein the processor circuit is arranged to not transmit or receive on a second connection of the plurality of connections, and
wherein the processor circuit is arranged to tune away from a first operation of the at least one operations on the first connection to perform a second operation on the second connection of the plurality of connections,
wherein the processor circuit is arranged to signal a tune away signal to the at least one network entities,
wherein the processor circuit is arranged to inform the at least one network entities of the first connection that the tune away duration is longer than a tune away duration in response indication that the second operation takes more time then permitted,
wherein the tune away duration is defined by the tune away signal.

2. The device of claim 1, wherein the second operation comprises at least one of:
   reading a broadcast of system information,
   receiving Radio Access Network-based notification area updates,
   reading a paging channel during a paging occasion,
   reading a Physical Downlink Control Channel monitoring occasion,
   receiving or transmitting according to a semi-persistent scheduling,
   transmitting on a configured grant,
   performing a measurement,
   performing a random access,
   transmitting on a scheduled grant,
   transmitting any control information,
   receiving scheduled data,
   transmitting on a sidelink interface usmg any sidelink physical channel.

3. The device of claim 1,
   wherein the resources for the tune away signal are pre-configured,
   wherein the processor circuit is arranged to receive the resources in an RRC configuration/reconfiguration message.

4. The device of claim 1, wherein the tune away signal comprises an indication of the first operation the device tunes to and/or a time the device is tuned away from the first operation.

5. The device of claim 1, wherein the informing is by:
   signaling a long tune away signal, to the at least one network entities of the first connection; and
   signaling a tune away signal update to the at least one network entities of the first connection.

6. The device of claim 1, wherein the second operation taking more time comprises at least one of the following:
   receiving a call in a paging occasion;
   receiving an indication that data will be received; and
   receiving an indication that a high priority operation will be performed.

7. The device of claim 1,
   wherein the plurality of connections have a state the states comprising:
   an RRC CONNECTED state;
   an RRC INACTIVE state; and
   an IDLE state.

8. The device of claim 1, wherein the first connection transitions to the RRC INACTIVE state when tuning away.

9. The device of claim 1,
   wherein the processor circuit is arranged to perform at least one operations on the plurality of connections at operation occasions,
   wherein the processor circuit is arranged to transmit/receive to/from the at least one network entities on a first connection of the plurality of connections.

10. The device of claim 1,
    wherein the resources for the tune away signal are pre-configured,
    wherein the processor circuit is arranged to receive the resources for the tune away signal are dynamically assigned as a part of a resource assignment during an RRC CONNECTED state.

11. A network entity comprising:
    a processor circuit; and
    a memory circuit, wherein the memory is arranged to store instructions for the processor circuit,
    wherein the network entity is connected to a user device via at least one wireless communication systems,
        wherein the user device shares at least one of transceiver chains with a plurality of connections to the at least one wireless communication systems,
        wherein the user device is arranged to perform at least one operations on the plurality of connections at operation occasions,
        wherein the user device is arranged to transmit/receive to/from the network entity on a first connection of the plurality of connections,
    wherein the processor circuit is arranged to receive a tune away signal from the user device,
    wherein the tune away signal indicating to the network entity that the user device tunes away from a first operation on the first connection that is served by the network entity to perform a second operation on a second connection that is served by a second network entity,
    wherein the processor circuit is arranged to receive an indication that the tune away duration is longer than a tune away duration in response indication that the second operation takes more time then permitted,
    wherein the tune away duration is defined by the tune away signal.

12. The network entity of claim 11, wherein the processor circuit is arranged to receive information about the at least one associated with at least one second connection of the plurality of connections.

\* \* \* \* \*